United States Patent
Ökvist et al.

(10) Patent No.: US 11,764,844 B2
(45) Date of Patent: Sep. 19, 2023

(54) WIRELESS DEVICES AND METHODS THEREIN FOR HANDLING TRANSMISSIONS BETWEEN THE DEVICES OVER A DIRECT DEVICE-TO-DEVICE (D2D) COMMUNICATION LINK

(71) Applicant: Telefonaktiebolaget LM Ericsson (PUBL), Stockholm (SE)

(72) Inventors: Peter Ökvist, Luleå (SE); Tommy Arngren, Södra Sunderbyn (SE); Stefan Wänstedt, Luleå (SE); Anders Landström, Boden (SE); Hans Hannu, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/766,968

(22) PCT Filed: Oct. 9, 2019

(86) PCT No.: PCT/SE2019/050989
§ 371 (c)(1),
(2) Date: Apr. 6, 2022

(87) PCT Pub. No.: WO2021/071400
PCT Pub. Date: Apr. 15, 2021

(65) Prior Publication Data
US 2023/0126503 A1 Apr. 27, 2023

(51) Int. Cl.
*H04W 72/04* (2023.01)
*H04B 7/06* (2006.01)

(52) U.S. Cl.
CPC ......... *H04B 7/0617* (2013.01); *H04B 7/0632* (2013.01)

(58) Field of Classification Search
CPC ..... H04B 7/0617; H04B 7/0632; H04W 4/40; H04W 4/44; H04W 4/46; H04W 72/40
See application file for complete search history.

(56) References Cited

U.S. PATENT DOCUMENTS

2015/0133112 A1 5/2015 Wang et al.
2018/0310230 A1* 10/2018 Niu .................... H04W 48/12
(Continued)

FOREIGN PATENT DOCUMENTS

EP  2 919 511 A1  9/2015

OTHER PUBLICATIONS

3GPP TSG RAN WG1 Meeting Ad-Hoc 1901; Taipei, TW; Source: Toyota InfoTechnology Center, USA; Title: Sidelink resource allocation for NR V2X with mode 2(d) in mobile operator bands and bands over 6 GHz (R1-1900782)—Jan. 21-25, 2019.
(Continued)

*Primary Examiner* — David S Huang
(74) *Attorney, Agent, or Firm* — BAKER BOTTS L.L.P.

(57) ABSTRACT

A method performed by a first wireless device (121) is provided. The method comprises transmitting (503) a radio signal towards the at least one second wireless device indicating that the first wireless device is, or that the at least one second wireless device has an option to be, responsible for beamforming of transmissions over the direct D2D communication link. The method also comprises receiving (505) information from the at least one second wireless device indicating which of the first wireless device or the at least one second wireless device is to be responsible for beamforming of transmissions over the direct D2D communication link. Further, the method comprises configuring (506), based on the received information, which of the first wireless device or the at least one second wireless device is (Continued)

to be responsible for beamforming of transmissions over the direct D2D communication link.

20 Claims, 12 Drawing Sheets

(56) References Cited

U.S. PATENT DOCUMENTS

2019/0116605 A1    4/2019  Luo et al.
2021/0099847 A1*   4/2021  Uchiyama ............ H04B 7/0695
2021/0297128 A1*   9/2021  Badic .................... H04W 72/20

OTHER PUBLICATIONS

European Search Report issued for Application No./Patent No. 19948826.3-1206/4042737—dated Sep. 14, 2022.
3GPP TSG RAN WG1 meeting #94; Gothenburg, Sweden; Source: Toyota InfoTechnology Center; Title: Discussion on beam management for NR-V2X sidelink in millimeter-wave bands (R1-1809039)—Aug. 20-24, 2018.
3GPP TSG RAN WG1 Ad-Hoc Meeting 1901; Taipei; Source: Huawei, HiSilicon; Title: Sidelink physical layer procedures for NR V2X (R1-1900023)—Jan. 21-25, 2019.
3GPP TSG RAN WG1 Ad-Hoc Meeting 1901; Taipei; Source: Huawei, HiSilicon; Title: Beamforming for V2X sidelink for FR1 and FR2 (R1-1900862)—Jan. 21-25, 2019.
3GPP TSG RAN WG1 #96; Source: InterDigital Inc.; Title: Discussion on Physical Layer Procedures for NR V2X Sidelink (R1-1902596)—Feb. 25-Mar. 1, 2019.
PCT International Search Report issued for International application No. PCT/SE2019/050989—dated Sep. 2, 2020.
PCT Written Opinion of the International Searching Authority issued for International application No. PCT/SE2019/050989—dated Sep. 2, 2020.

* cited by examiner

301. Transmitting a radio signal towards at least one 2nd wireless device indicating that a 1st first wireless device is, or that the at least one 2nd wireless device has an option to be, responsible for beamforming of transmissions over a direct D2D communication link 302. Receiving information from the at least one 2nd wireless device indicating which of the 1st wireless device or the at least one 2nd wireless device is to be responsible for beamforming of transmissions over the direct D2D communication link 303. Configuring, based on the received information, which of the 1st wireless device or the at least one 2nd wireless device is to be responsible for beamforming of transmissions over the direct D2D communication link 304. Performing beamformed transmissions to/from the at least one 2nd wireless device over the direct D2D communication link based on the configuration

Fig. 3

401. Receiving a radio signal from a 1st wireless device indicating that the 1st wireless device is, or that the at least one 2nd wireless device has an option to be, responsible for beamforming of transmissions over the direct D2D communication link

402. Determining which of the 1st wireless device or the at least one 2nd wireless device is to be responsible for beamforming of transmissions over the direct D2D communication link

403. Transmitting information to the 1st wireless device indicating which of the 1st wireless device or the at least one 2nd wireless device is to be responsible for beamforming of transmissions over the direct D2D communication link

404. Performing beamformed transmissions to/from the 1st wireless device over the direct D2D communication link

Fig. 4

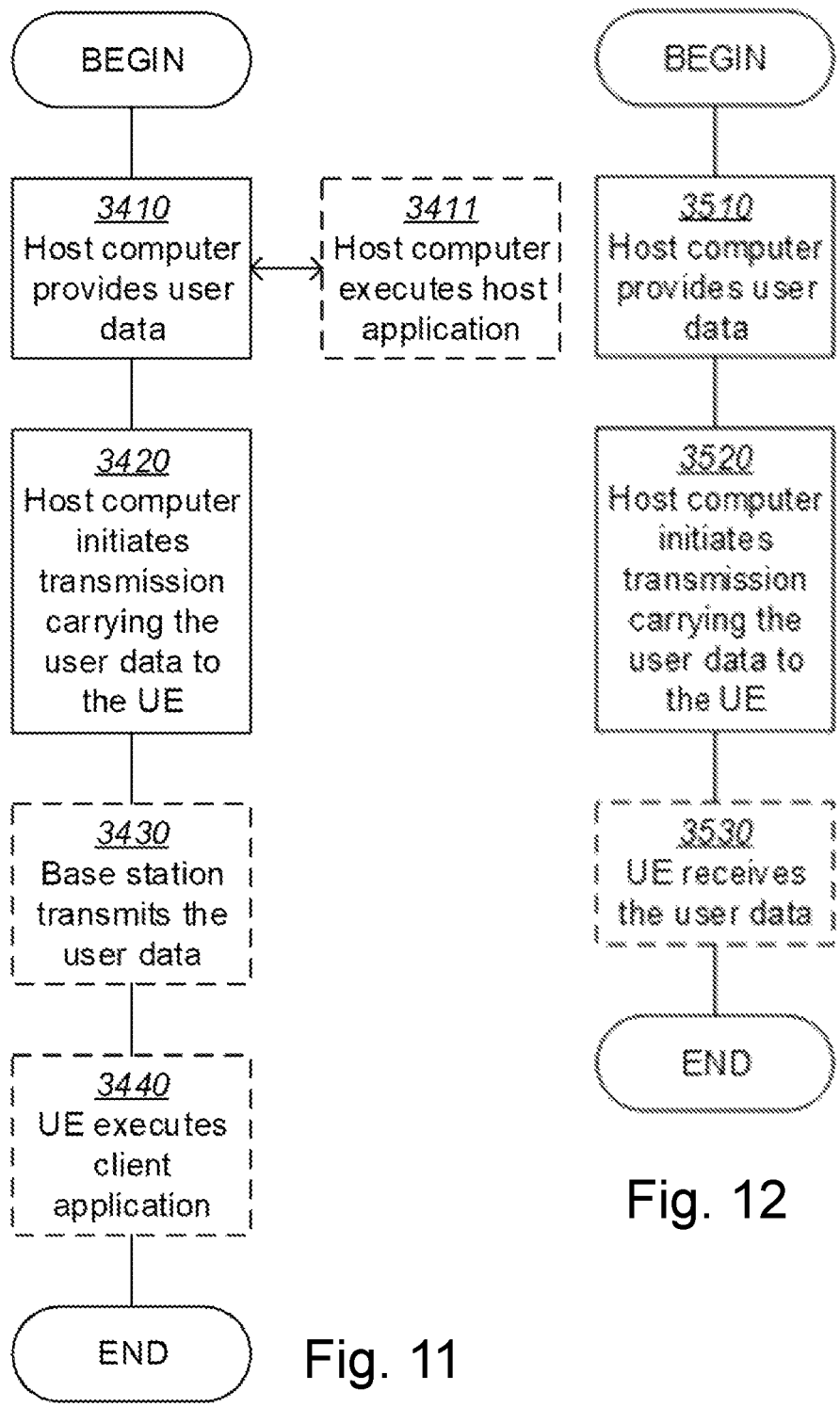

WIRELESS DEVICES AND METHODS THEREIN FOR HANDLING TRANSMISSIONS BETWEEN THE DEVICES OVER A DIRECT DEVICE-TO-DEVICE (D2D) COMMUNICATION LINK

PRIORITY

This nonprovisional application is a U.S. National Stage Filing under 35 U.S.C. § 371 of International Patent Application Serial No. PCT/SE2019/050989 filed Oct. 9, 2019 and entitled "WIRELESS DEVICES AND METHODS THEREIN FOR HANDLING TRANSMISSIONS BETWEEN THE DEVICES OVER A DIRECT DEVICE-TO-DEVICE (D2D) COMMUNICATION LINK" which is hereby incorporated by reference in its entirety.

TECHNICAL FIELD

Embodiments herein relate to transmissions between wireless devices. In particular, embodiments herein relate to a first wireless device and method therein for handling transmissions between the first wireless device and at least one second wireless device over a direct device-to-device, D2D, communication link. Also, embodiments herein relate to a second wireless device and method therein for handling transmissions between the second wireless device and a first wireless device over a direct D2D communication link. Further, embodiments herein relate to a computer program and a carrier.

BACKGROUND

In today's wireless communications networks a number of different technologies are used, such as New Radio (NR), Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations or wireless access points providing radio coverage over at least one respective geographical area forming a cell. This may be referred to as a Radio Access Network, RAN. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station in the RAN. Commonly, the wireless devices transmit data over an air or radio interface to the radio base stations in uplink, UL, transmissions and the radio base stations transmit data over an air or radio interface to the wireless devices in downlink, DL, transmissions.

However, Device-to-Device, D2D, communication is gaining interest by mobile interested parties for connecting wireless devices; one driving force for D2D connectivity is the inherent flexibility for operators to offload traffic from the core network. D2D connectivity represents a way for operators to reduce the energy and cost particularly for supporting proximity-based services, ProSe. Typical applications range from public safety, traffic control/safety and commercial services like proximity based social networking, gaming, and advertisements for by-passers. In some cases, D2D communication may also be referred to as Vehicle-to-Everything, V2x, communication when implemented in a vehicle communicating directly with another vehicle and/or other wireless devices in its surrounding.

In network assisted D2D communications, a network such as a radio access network assists wireless devices that are in the proximity of each other to discover one another, referred to as device discovery, and establish a direct link referred to as D2D bearer establishment, rather than a link via the radio base station. This creates a wireless single hop direct D2D link between the wireless devices.

Network assisted D2D communication commonly refers to two distinct cases in terms of the number of radio base stations, such as, e.g. an eNB/eNodeB, that are involved. In a single eNB case, both wireless devices are connected or camp on, i.e. are served by the same eNB. In a multiple eNB case, the two wireless devices that are candidates for direct D2D communications are served by different eNBs.

In network assisted device discovery the RAN may, for example, allocate resources for beacon signals, so that transmitting and receiving wireless devices know what time and frequency resources being used for device discovery, that is when and at what frequencies beacons should be transmitted and scanned for or received. Alternatively, a wireless device may register at the network for D2D communications. Subsequently, another wireless device may inquire the network for possible peers allowing the network to mediate between wireless devices, i.e. basically to match the wireless devices in finding each other.

The initiation of the establishment of the D2D link may be made by the RAN or by any of the wireless devices of the D2D pair. In network initiated D2D link establishment, the network realizes that two communicating wireless devices are in the proximity of each other. In user equipment initiated D2D link establishment, the wireless devices discover the proximity of each other and also some of their capabilities which is necessary for them to establish a D2D link, similar to Bluetooth. In both cases, since communication takes place in operator licensed spectrum, current methods allow the eNB, or other network node in the RAN, to control the actually used transmission resources by the D2D link.

In network assisted D2D bearer establishment, the network indicates to the wireless devices which time and frequency resources and what transmit power levels they should use for the direct communication. The network may subsequently send periodic commands to the D2D pair regarding the resources that they should use for the direct D2D link. In that way, the devices of the D2D pair maintain a cellular control plane, while the user plane is established directly between the devices.

However, since implementing this in various kinds of applications within different areas (such as public safety, traffic control/safety, and/or commercial services, e.g. proximity based social networking, gaming, and advertisements for by-passers) has the potential to grow exponentially, there is a need to increase the efficiency of these applications. One example is reducing the interference caused by the V2x/D2D transmissions between the wireless devices, thereby improving the use of direct V2x/D2D communication links between wireless devices in a wireless communications network.

SUMMARY

It is an object of embodiments herein to improve the use of direct V2x/D2D communication links between wireless devices in a wireless communications network.

According to a first aspect of embodiments herein, the object is achieved by a method performed by a first wireless device for handling beamformed transmissions between the first wireless device and at least one second wireless device over a direct device-to-device, D2D, communication link. The method comprises transmitting a radio signal towards the at least one second wireless device indicating that the first wireless device is, or that the at least one second wireless device has an option to be, responsible for beamforming of transmissions over the direct D2D communication link. Also, the method comprises receiving information from the at least one second wireless device indicating which of the first wireless device or the at least one second wireless device is to be responsible for beamforming of transmissions over the direct D2D communication link. Furthermore, the method comprises configuring, based on the received information, which of the first wireless device or the at least one second wireless device is to be responsible for beamforming of transmissions over the direct D2D communication link.

According to a second aspect of embodiments herein, the object is achieved by a first wireless device for handling beamformed transmissions between the first wireless device and at least one second wireless device over a direct D2D communication link. The first wireless device being configured to transmit a radio signal towards the at least one second wireless device indicating that the first wireless device is, or that the at least one second wireless device has an option to be, responsible for beamforming of transmissions over the direct D2D communication link. The first wireless device is also configured to receive information from the at least one second wireless device indicating which of the first wireless device or the at least one second wireless device is to be responsible for beamforming of transmissions over the direct D2D communication link. The first wireless device is also configured to configure, based on the received information, which of the first wireless device or the at least one second wireless device is to be responsible for beamforming of transmissions over the direct D2D communication link.

According to a third aspect of embodiments herein, the object is achieved by a method performed by a second wireless device for handling beamformed transmissions between the second wireless device and a first wireless device over a direct D2D communication link. The method comprises receiving a radio signal from the first wireless device indicating that the first wireless device is, or that the second wireless device has an option to be, responsible for beamforming of transmissions over the direct D2D communication link. Also, the method comprises determining which of the first wireless device or the second wireless device is to be responsible for beamforming of transmissions over the direct D2D communication link. Further, the method comprises transmitting information to the first wireless device indicating which of the first wireless device or the second wireless device is to be responsible for beamforming of transmissions over the direct D2D communication link.

According to a fourth aspect of embodiments herein, the object is achieved by a second wireless device for handling beamformed transmissions between the second wireless device and a first wireless device over a direct D2D communication link. The second wireless device being configured to receive a radio signal from the first wireless device indicating that the first wireless device is, or that the second wireless device has an option to be, responsible for beamforming of transmissions over the direct D2D communication link, determine which of the first wireless device or the second wireless device is to be responsible for beamforming of transmissions over the direct D2D communication link, and transmit information to the first wireless device indicating which of the first wireless device or the second wireless device is to be responsible for beamforming of transmissions over the direct D2D communication link.

According to a fifth aspect of the embodiments herein, a computer program is also provided configured to perform the method described above. Further, according to a sixth aspect of the embodiments herein, carriers are also provided configured to carry the computer program configured for performing the method described above.

By announcing and negotiating the responsibility of beamformed transmissions in a D2D communication link as described above, a first wireless device is able to direct its transmissions over a D2D communication link directly towards intended one or more second wireless devices, or have one or more second wireless devices direct its transmissions over a D2D communication link directly towards the wireless device, depending on which of the wireless devices is most suitable for the task. The suitability of a wireless device to take responsibility for beamformed transmissions in a D2D communication link may depend on the current scenario and capabilities of the wireless devices involved. Besides assigning the responsibility of the beamforming to the most suitable wireless device, the amount of interference spread to the surrounding is advantageously reduced since the transmission signal is no longer spread in an omni-directional manner. Hence, the use of D2D communication links between wireless devices in a wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 3 is a flowchart depicting embodiments of a method in a first wireless device, FIG. 4 is a flowchart depicting embodiments of a method in a second wireless device.

FIG. 11 is a flowchart illustrating a method implemented in a communication system, in accordance with one embodiment.

FIG. 12 is a flowchart illustrating a method implemented in a communication system, in accordance with one embodiment.

DETAILED DESCRIPTION

Figure 1:
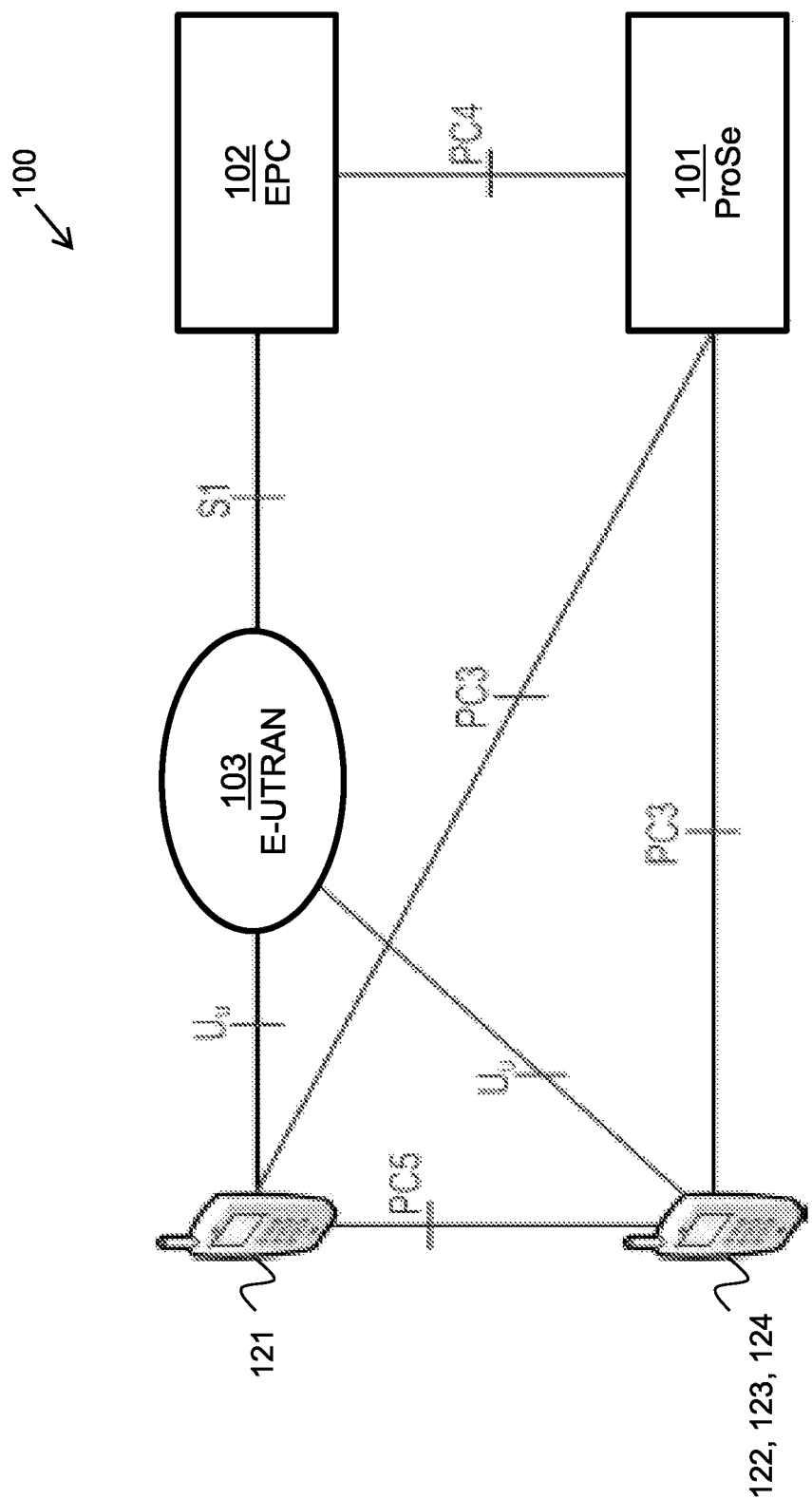
FIG. 1 is a schematic block diagram of a network architecture for ProSe in an LTE network.

The figures are schematic and simplified for clarity, and they merely show details which are essential to the understanding of the embodiments presented herein, while other details have been left out. Throughout, the same reference numerals are used for identical or corresponding parts or steps.

FIG. 1 illustrates a simplified architecture for ProSe, Proximity Services, in a wireless communications network 100 based on LTE. ProSe is a D2D technology that allows LTE-enabled wireless devices to detect each other and to communicate directly. It relies on multiple enhancements to existing LTE standards including new functional elements and a "sidelink" air interface for direct connectivity between devices.

In FIG. 1, the ProSe functionality comprise a SideLink, SL, interface, i.e. PC5, between a first wireless device 121 and at least one second wireless device 122, 123, 124. The first wireless device 121 and the at least one second wireless device 122, 123, 124 are configured to communicate with a ProSe node 101 over a PC3 interface. The ProSe node 101 in turn is arranged to communicate with an LTE Evolved Packet Core, EPC 102, via a PC4 interface. The EPC 102 is also reachable by the first wireless device 121 and the at least one second wireless device 122, 123, 124 via the radio access network E-UTRAN 103.

ProSe services may be provided when the first wireless device 121 and the at least one second wireless device 122, 123, 124 are close to each other. The ProSe services may comprise ProSe Direct Discovery, which identifies that the first wireless device 121 and the at least one second wireless device 122, 123, 124 are in proximity of each other (for two wireless devices in cellular coverage it may also be used for other commercial purposes), and ProSe Direct Communication, wherein resources from cellular traffic are reserved and used for the direct D2D communication between the first wireless device 121 and the at least one second wireless device 122, 123, 124, or enables direct D2D communication in areas without cellular coverage. SideLink may be used for ProSe Direct Discovery and Prose Direct communication between the first wireless device 121 and the at least one second wireless device 122, 123, 124 and thus corresponds to the communication between two ProSe enabled wireless devices. The SideLink communication describes the channel structure consisting of Logical, Transport and Physical channels over the air interface to realize a ProSe application.

It should be noted that for 3GPP Standard Release 12, the PC5 is a one-to-many communication interface, i.e. it is specified for group communication. From a higher layer perspective, this is reflected in the assignment of destination IDs, which are always group IDs, However, to achieve some sort of unicast, a group may have just one member. Using the PC3 interface, the first wireless device 121 may contact the ProSe Function. According to one example, the IP address of the ProSe Function may be preconfigured or hard-coded in the first wireless device 121, or configured at a later stage. Alternatively, the first wireless device 121 may identify the IP address of the ProSe Function via DNS look-up. To contact the ProSe Function, the first wireless device 121 has to establish an RRC connection with the wireless communications network 100.

For the sake of the embodiments herein, the wireless communications network 100 is described in FIG. 1 as an LTE-based radio communications network, but may also employ technology of any one of New Radio (NR), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), Ultra Mobile Broadband (UMB) or GSM, or any other similar network or system. The wireless communications network 100 may also be an Ultra Dense Network, UDN, which e.g. may transmit on millimetre-waves (mmW). Further, the first wireless device 121 and the at least one second wireless device 122, 123, 124 are configured to communicate within the wireless communications network 100 over a radio link, Uu, served by a network node (not shown inn FIG. 1) in the E-UTRAN 103. The first wireless device 121 and the at least one second wireless device 122, 123, 124 may refer to any type of wireless device or user equipment (UE) communicating with a network node and/or with another wireless device in a cellular, mobile or radio communication network or system. Examples of such wireless devices are mobile phones, cellular phones, Personal Digital Assistants (PDAs), smart phones, tablets, sensors equipped with a UE, Laptop Mounted Equipment (LME) (e.g. USB), Laptop Embedded Equipments (LEEs), Machine Type Communication (MTC) devices, or Machine to Machine (M2M) device, Customer Premises Equipment (CPE), wireless device capable of machine to machine (M2M) communication, Vehicle-to-Vehicle, V2V, wireless device, or V2x wireless devices, etc. It should be noted that the first wireless device 121 and the at least one second wireless device 122, 123, 124 may be have a single antenna or multiple antennas, i.e. more than one antenna, in order to support Single User MIMO, SU-MIMO, or Multi-User MIMO, MU-MIMO, transmissions.

Figure 2:
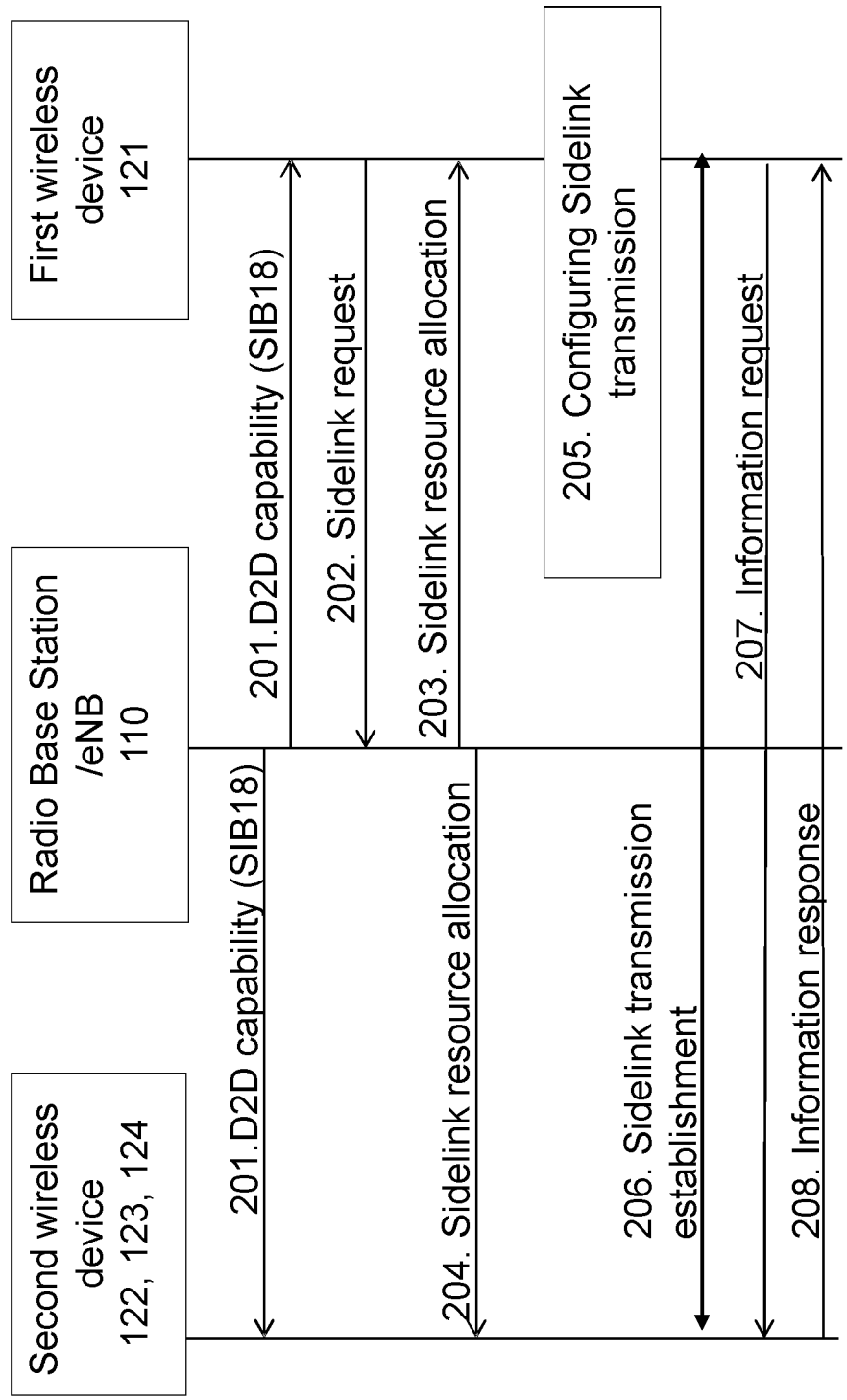
FIG. 2 is a signalling diagram illustrating the setup of a ProSe V2x/D2D transmission over Sidelink/PC5.

FIG. 2 illustrates an example scenario where the first wireless device 121 desires to communicate with at least one second wireless device 122, 123, 124 in the coverage area of a radio base station or eNB 110, e.g. in the E-UTRAN 103 in FIG. 1. The first wireless device 121 sets up a direct V2x/D2D communication via SideLink over a PC5 interface.

Action 201. Initially, the first wireless device 121 and the at least one second wireless device 122, 123, 124 enter the coverage area of the radio base station 110, or are powered on within said coverage area. The first wireless device 121 and the at least one second wireless device 122, 123, 124 will then be informed about the radio base station's 110 capability and support to serve Sidelink communications via System Information Block 18, SIB18.

Action 202. The first wireless device 121 requests the radio base station 110 for permission to use transmission resources for a SideLink transmission over PC5 interface.

Action 203. The radio base station 110 indicates transmission resource allocations for the SideLink transmission to the first wireless device 121. For example, by acknowledging to the first wireless device 121 that it may use an announcement for a SideLink transmission targeting the at least one second wireless device 122, 123, 124 using specific transmission resources selected by the radio base station 110.

Action 204. The radio base station 110 also indicates transmission resource allocations for the SideLink transmission to the at least one second wireless device 122, 123, 124, for example, by instructing the at least one second wireless device 122, 123, 124 not to use certain UL transmission resources for "own transmissions". This is done because potential imminent incoming transmissions, via SideLink allocated on UL resources, is to be expected from a near announcing wireless device, i.e. the first wireless device 121.

Action 205. The first wireless device 121 then configures the SideLink communication link for transmission.

Action 206. The first wireless device 121 and the at least one second wireless device 122, 123, 124 may then establish a SideLink communication link therein between.

Action 207. The first wireless device 121 may then requests the at least one second wireless device 122, 123, 124 to provide some required information. The required information may relate to the intention that the first wireless device 121 has with the communication towards the at least one second wireless device 122, 123, 124, such as, for example, to provide information, e.g. sensor data, to the first wireless device 121 support an application in the first wireless device 121.

Action 208. The at least one second wireless device 122, 123, 124 then provides the first wireless device 121 with the requested information. Hence, the first wireless device 121 may, for example, comprise performing actions in the first wireless device 121 related to the received information from the at least one second wireless device 122, 123, 124, and/or passing the received information on towards upper layers, such as, e.g. an application layer, in the first wireless device 121.

As part of the developing of the embodiments described herein, it has been realized that current transmissions via SideLink only considers omni-directional transmissions from the first wireless device 121 and the at least one second wireless device 122, 123, 124. This means that the SideLink transmissions will be spread in directions that are not useful for the specific communication between the first wireless device 121 and the at least one second wireless device 122, 123, 124, and therefore unnecessarily interfere with other transmission in those directions. For example, assume that the first wireless device 121 is implemented in a first vehicle A and the at least one second wireless device 122, 123, 124 is implemented in a second vehicle B. Then, the first wireless device 121 may receive a SideLink transmission indicating that the at least one second wireless device 122, 123, 124 in the one or more second vehicle B has detected a hazard, however, the first wireless device 121 in the first vehicle A has no immediate means to understand if the detected hazard by the at least one second wireless device 122, 123, 124 in the one or more second vehicle B will affect the first vehicle A. Therefore, it is also realized that it would be advantageous for many different reasons in the above described case if the SideLink transmission from the first wireless device 121 in the first vehicle A instead could be directed in a direction straight towards the wireless devices that are intended for receiving and/or transmitting information, i.e. in this case the at least one second wireless device 122, 123, 124 in the one or more second vehicle B. For example, the relative travel direction of the first vehicle A and the one or more second vehicle B that may be deduced from such directed transmissions may advantageously be used to enhance a variety of different services/applications. For example, the relative travel direction may be used to improve automatic braking in the one or more second vehicle B in case a hazard has been detected by the first vehicle A by enabling the first vehicle A to increase the signal strength in a SideLink transmission directed straight towards the one or more second vehicle B that will be affected by the hazard. In another example, a rescue vehicle approaching a road crossing would benefit from announcing its approach to a certain road crossing using its front-facing antennas, and correspondingly, transmitting in the same front-facing beam direction.

This functionality is enabled by the embodiments herein by having the first wireless device 121 and the at least one second wireless device 122, 123, 124 announcing and negotiating the responsibility of beamformed transmissions over a direct D2D communication therein between, as described below with reference to FIGS. 3-8. The responsibility, or roles, of the wireless devices may be based on, for example, the intentions of the transmissions (e.g. inbound or outbound traffic in a V2x scenario), respective beamforming capabilities of the first wireless device 121 and the at least one second wireless device 122, 123, 124 (e.g. antenna constellation, direction, height, beam angles, etc.), mobility aspects of the first wireless device 121 and the at least one second wireless device 122, 123, 124, (e.g. relative travel directions of the wireless devices), etc.

Examples of embodiments of a method performed by a first wireless device 121 for handling beamformed transmissions between the first wireless device 121 and at least one second wireless device 122, 123, 124 over a direct D2D communication link will now be described with reference to the flowchart depicted in FIG. 3. FIG. 3 is an illustrated example of actions or operations which may be taken by the first wireless device 121 in the wireless communication network 100. The method may comprise the following actions.

Action 301

The first wireless device 121 transmits a radio signal towards the at least one second wireless device 122, 123, 124 indicating that the first wireless device 121 is, or that the at least one second wireless device 122, 123, 124 has an option to be, responsible for beamforming of transmissions over the direct D2D communication link. This means that the first wireless device 121 announces its beamforming capabilities and initiates a negotiation regarding which of the first wireless device 121 or the at least one second wireless device 122, 123, 124 is most suitable to handle the beamforming of the transmissions over the direct D2D communication link.

In some embodiments, the first wireless device 121 may transmit the radio signal in an initial set of wide beams over the direct D2D communication link. This may indicate to the at least one second wireless device 122, 123, 124 that the first wireless device 121 is to be responsible for the beamforming of transmissions over the direct D2D communication link. In other words, by transmitting the radio signal in an initial set of wide beams, the first wireless device 121 may take responsibility for beamforming transmissions over the direct D2D communication link between the first wireless device 121 and the at least one second wireless device 122, 123, 124. Hence, it also announces this fact to the at least one second wireless device 122, 123, 124.

In some embodiments, the radio signal transmitted by the first wireless device 121 may comprises a request for the at least one second wireless device 122, 123, 124 to be responsible for the beamforming of transmissions over the direct D2D communication link. This may, for example, be advantageous when the first wireless device 121 is less capable of performing beamformed transmissions that other wireless devices, e.g. the at least one second wireless device 122, 123, 124. In other words, if a less capable device requests a connection with another wireless device that is more capable of performing beamformed transmissions; it would, in that procedure, be advantageous if said wireless devices considered a negotiating phase where respective devices beam management capabilities were compared and used to accomplish a more suitable direct D2D communication setup. In some embodiments, the request may further comprise wide-beam characteristics or narrow-beam characteristics indicating absolute or relative directions of one or more antennas of the first wireless device 121 in respect of the current movement direction of at least one second wireless device 122, 123, 124. This may be advantageous fora variety of different services in the first wireless device 121 that may utilize this directional parameter in its configuration, e.g. automatic braking of vehicles in different traffic scenarios. The narrow-beam characteristics of the first wireless device 121 may further comprise, for example, number of narrow beams, narrow beam angles, antenna height, etc. This information enables the second wireless device 122, 123, 124 to determine which of the first wireless device 121 or the at least one second wireless device 122, 123, 124 is to be responsible for beamforming of transmissions over the direct D2D communication link, i.e. determine which of the wireless devices is most suitable to manage beamformed transmission over the direct D2D communication link between the first wireless device 121 and the second wireless device 122, 123, 124.

In some embodiments, the transmitted radio signal may comprise an indication that no subsequent narrow beam refinement is required in the beamforming of transmissions between the first wireless device 121 and the at least one second wireless device 122, 123, 124 over the direct D2D communication. This may be particularly advantageous when, for example, having short burst-like transmissions of small amount of data, such as, e.g. sensor status notifications or similar. In this case, there may be no need for beam refinement, since the duration of the data transmission will be very short.

In some embodiments, the transmission of the radio signal may be performed on Sounding Reference Signal, SRS, transmission resources of the direct D2D communication link. This may also be referred to as SL SRS, SideLink SRS, transmission resources.

Action 302

After transmitting the radio signal in Action 301, the first wireless device 121 receives information from the at least one second wireless device 122, 123, 124 indicating which of the first wireless device 121 or the at least one second wireless device 122, 123, 124 is to be responsible for beamforming of transmissions over the direct D2D communication link. This means that the at least one second wireless device 122, 123, 124 responds to the announcement and negotiation by the first wireless device 121.

In some embodiments, in case the radio signal was transmitted in an initial set of wide beams in Action 301, the received information from the at least one second wireless device 122, 123, 124 may comprise a measurement report on the received signal strength on the initial set of wide beams transmitted from the first wireless device 121. This measurement report may indicate to the first wireless device 121 that the first wireless device 121 is to be responsible for the beamforming of transmissions over the direct D2D communication link. This may serve as a confirmation from the at least one second wireless device 122, 123, 124 that the first wireless device 121 is to be responsible for the beamforming.

In some embodiment, in case a request was comprised in the radio signal transmitted by the first wireless device 121, the received information from the at least one second wireless device 122, 123, 124 may comprise an acknowledgement, ACK, or non-acknowledgement, NACK, of the request for the at least one second wireless device 122, 123, 124 to be responsible for beamforming of transmissions over the direct D2D communication link. This means that the first wireless device 121 is made aware of the at least one second wireless device 122, 123, 124 capabilities to take on the responsibility of performing beamformed transmission over the direct D2D communication.

According to some embodiments, in case a NACK of the request is received from the at least one second wireless device 122, 123, 124, the first wireless device 121 may either terminate the direct D2D communication link if beamformed transmissions are mandated in the first wireless device 121, or configure the direct D2D communication link for non-beamformed transmissions if beamformed transmissions are optional in the first wireless device 121. This means that first wireless device 121 may select to end the direct D2D communication, e.g. if beamformed transmissions are mandatory for the specific SideLink transmission, or configure the direct D2D communication for a legacy D2D transmission procedure comprising conventional omni-directional transmissions, i.e. a non-beamformed transmission.

Instead, in case an ACK of the request is received from the at least one second wireless device 122, 123, 124, the first wireless device 121 may, according to some embodiments, receive, from the at least one second wireless device 122, 123, 124 over the direct D2D communication link, a radio signal in an initial set of wide beams. Subsequently, the first wireless device 121 may also measure the received signal strengths on the initial set of wide beams, and transmit, to the at least one second wireless device 122, 123, 124 over the direct D2D communication link, a measurement report on the received signal strengths on the initial set of wide beams transmitted from the first wireless device 121. In this case, the at least one second wireless device 122, 123, 124 has agreed to take on the responsibility of performing beamformed transmission over the direct D2D communication, and the first wireless device 121 allows the at least one second wireless device 122, 123, 124 to control the beamformed transmission over the direct D2D communication.

In some embodiments, the information from the at least one second wireless device 122, 123, 124 may be received on Sounding Reference Signal, SRS, transmission resources of the direct D2D communication link. This may also be referred to as SL SRS, SideLink SRS, transmission resources.

Action 303

After receiving the information from the at least one second wireless device 122, 123, 124, the first wireless device 121 configures, based on the received information, which of the first wireless device 121 or the at least one second wireless device 122, 123, 124 is to be responsible for beamforming of transmissions over the direct D2D communication link. This means that the first wireless device 121 is able to decide whether to self be in control of the beamforming transmissions over the direct D2D communication, e.g. in case of transmitting an initial set of wide beams in Action 301, or to delegate the responsibility to the at least one second wireless device 122, e.g. in case of transmitting a request in Action 301 and receiving an ACK in Action 302. However, it also allows the first wireless device 121 to fall back on legacy D2D communication or terminate the direct D2D communication entirely.

In some embodiments, in case a measurement report was received from the at least one second wireless device 122, 123, 124, the first wireless device 121 may configure the initial set of wide beams for the direct D2D communication link based on the received measurement report from the at least one second wireless device 122, 123, 124. This means that the first wireless device 121 may modify the initial set of wide beams into a single or fewer wide beams that are most suitable for the beamformed transmissions to the at least one second wireless device 122, 123, 124 in its beamforming procedure.

Action 304

After the configuration in Action 303, the first wireless device 121 may optionally perform beamformed transmissions towards the at least one second wireless device 122, 123, 124 over the direct D2D communication link. This means that the first wireless device 121 may proceed with beamforming transmissions in accordance with the configuration in Action 303 and the agreed responsibilities therein. Here, it should also be noted that the first wireless device 121 may, according to some embodiments, repeatedly perform conventional narrow beam refinement of the configured wide beam(s) when performing the beamformed transmissions over the direct D2D communication.

Examples of embodiments of a method performed by a second wireless device 122, 123, 124 for handling beamformed transmissions between the second wireless device 122, 123, 124 and a first wireless device 121 over a direct D2D communication link will now be described with reference to the flowchart depicted in FIG. 4. FIG. 4 is an illustrated example of actions or operations which may be taken by the second wireless device 122, 123, 124 in the wireless communication network 100. The method may comprise the following actions.

Action 401

The second wireless device 122, 123, 124 receives a radio signal from the first wireless device 121 indicating that the first wireless device 121 is, or that the second wireless device 122, 123, 124 has an option to be, responsible for beamforming of transmissions over the direct D2D communication link. This means that the second wireless device 122, 123, 124 is made aware of the beamforming capabilities of the first wireless device 121 and may engage in a negotiation regarding which of the first wireless device 121 or the second wireless device 122, 123, 124 is most suitable to handle the beamforming of the transmissions over the direct D2D communication link.

In some embodiments, the second wireless device 122, 123, 124 may receive the radio signal in an initial set of wide beams over the direct D2D communication link. This may indicate to the second wireless device 122, 123, 124 that the first wireless device 121 is to be responsible for the beamforming of transmissions over the direct D2D communication link. In other words, when the radio signal is received in an initial set of wide beams, the second wireless device 122, 123, 124 is made aware of the fact that the first wireless device 121 intends to take responsibility for beamforming transmissions over the direct D2D communication link between the first wireless device 121 and the second wireless device 122, 123, 124.

In some embodiments, the radio signal transmitted by the first wireless device 121 may comprise a request for the second wireless device 122, 123, 124 to be responsible for the beamforming of transmissions over the direct D2D communication link. Here, when the radio signal comprise a request, the second wireless device 122, 123, 124 is made aware of the fact that the first wireless device 121 may desire that the second wireless device 122, 123, 124 intends to take responsibility for beamforming transmissions over the direct D2D communication link between the first wireless device 121 and the second wireless device 122, 123, 124. This may, for example, be advantageous when the first wireless device 121 is less capable of performing beamformed transmissions that other wireless devices, e.g. the second wireless device 122, 123, 124. The request may comprise the specific capabilities of the first wireless device 121 for managing beamformed transmission over the direct D2D communication link between the first wireless device 121 and the second wireless device 122, 123, 124.

In particular, in some embodiments, the request may comprise wide-beam characteristics or narrow-beam characteristics indicating absolute or relative directions of one or more antennas of the first wireless device 121 in respect of the current movement direction of the second wireless device 122, 123, 124. This may be advantageous for a variety of different services in the second wireless device 122, 123, 124 that may utilize this directional parameter in its configuration, e.g. automatic braking of vehicles in different traffic scenarios. The narrow-beam characteristics of the first wireless device 121 may further comprise, for example, number of narrow beams, narrow beam angles, antenna height, etc. This information enables the second wireless device 122, 123, 124 to determine which of the first wireless device 121 or the at least one second wireless device 122, 123, 124 is to be responsible for beamforming of transmissions over the direct D2D communication link, i.e. determine which of the wireless devices is most suitable to manage beamformed transmission over the direct D2D communication link between the first wireless device 121 and the second wireless device 122, 123, 124. In some embodiments, the received radio signal comprise an indication that no subsequent narrow beam refinement is required in the beamforming of transmissions between the second wireless device 122, 123, 124 and the first wireless device 121 over the direct D2D communication. This may be particular advantageous when, for example, having short burst-like transmissions of small amount of data, such as, e.g. sensor status notifications or similar. In this case, there may be no need for beam refinement, since the duration of the data transmission will be very short.

In some embodiments, the radio signal may be received on Sounding Reference Signal, SRS, transmission resources of the direct D2D communication link. This may also be referred to as SL SRS, SideLink SRS, transmission resources.

Action 402

After receiving the radio signal in Action 401, the second wireless device 122, 123, 124 determines which of the first wireless device 121 or the second wireless device 122, 123, 124 is to be responsible for beamforming of transmissions over the direct D2D communication link. This means that the second wireless device 122, 123, 124 responds to the announcement and negotiation initiated by the first wireless device 121. In some embodiments, in case the radio signal is received in an initial set of wide beams in Action 401, the second wireless device 122, 123, 124 determines that the first wireless device 121 is to be responsible for beamforming transmissions over the direct D2D communication link. In this case, the second wireless device 122, 123, 124 measure the received signal strengths on the initial set of wide beams. This may form the basis for the measurement report transmitted in this case from the second wireless device 122, 123, 124 to the first wireless device 121 in Action 403.

In some embodiments, in case the radio signal transmitted by the first wireless device 121 may comprise a request for the second wireless device 122, 123, 124 to be responsible for the beamforming of transmissions over the direct D2D communication link, the second wireless device 122, 123, 124 may use the information in the request to determine which of the first wireless device 121 or the second wireless device 122, 123, 124 is to be responsible for beamforming of transmissions over the direct D2D communication link, such as, e.g. comparing the capabilities of the first wireless device 121 with the capabilities of the second wireless device 122, 123, 124 when it comes to managing beamformed transmissions over the direct D2D communication link between the first wireless device 121 and the second wireless device 122, 123, 124. This may then form the basis of whether to send an ACK or NACK response to the first wireless device 121 in Action 403.

Action 403

After the determination in Action 402, the second wireless device 122, 123, 124, transmits information to the first wireless device 121 indicating which of the first wireless device 121 or the second wireless device 122, 123, 124 is to be responsible for beamforming of transmissions over the direct D2D communication link. This means that the first wireless device 121 is made aware of the second wireless device 122, 123, 124 capabilities to take on the responsibility of performing beamformed transmission over the direct D2D communication.

In some embodiments, in case the radio signal was received in an initial set of wide beams in Action 401, the second wireless device 122, 123, 124 may transmit information comprising a measurement report on the received signal strengths of the radio signal on the initial set of wide beams, wherein the measurement report indicates to the first wireless device 121 that the first wireless device 121 is to be responsible for the beamforming of transmissions over the direct D2D communication link. This serves as a confirmation from the second wireless device 122, 123, 124 that the first wireless device 121 is to be responsible for the beamforming.

In some embodiment, in case a request was comprised in the radio signal received from the first wireless device 121 in Action 401, the second wireless device 122, 123, 124 may transmit information comprising an acknowledgement, ACK, of the request if the second wireless device 122, 123, 124 has determined that it is to be responsible for beamforming of transmissions over the direct D2D communication link. Here, it should be noted that the ACK response may be a general response accepting the responsibility for beamforming of transmissions over the direct D2D communication link, or detailed individual ACK for each capability indicated in the request.

Optionally, the second wireless device 122, 123, 124 may transmit information comprising a non-acknowledgement, NACK, of the request if the second wireless device 122, 123, 124 has determined that it is not to be responsible for beamforming of transmissions over the direct D2D communication link. This means that the first wireless device 121 is notified about that the second wireless device 122, 123, 124 will not accept the responsibility of performing beamformed transmission over the direct D2D communication.

In some embodiments, the information may be transmitted on Sounding Reference Signal, SRS, transmission resources of the direct D2D communication link. This may also be referred to as SL SRS, SideLink SRS, transmission resources.

Action 404

After the transmission in Action 403, the second wireless device 122, 123, 124 may optionally perform beamformed transmissions towards the first wireless device 121 over the direct D2D communication link.

In some embodiments, in case an acknowledgement, ACK, of the request is transmitted from the second wireless device 122, 123, 124, the second wireless device 122, 123, 124 may subsequently transmit, to the first wireless device 121 over the direct D2D communication link, a radio signal in an initial set of wide beams. Then, the second wireless device 122, 123, 124 may receive, from the first wireless device 121 over the direct D2D communication link, a measurement report on the received signal strengths on the initial set of wide beams transmitted from the second wireless device 122, 123, 124. Thus, the second wireless device 122, 123, 124 may configure the initial set of wide beams for the direct D2D communication link based on the received measurement report from the first wireless device 121. This means that the second wireless device 122, 123, 124 may modify the initial set of wide beams into a single or fewer wide beams that are most suitable for the beamformed transmissions to the first wireless device 121 in its beamforming procedure. Here, it should also be noted that the second wireless device 122, 123, 124 may, according to some embodiments, repeatedly perform conventional narrow beam refinement of the configured wide beam(s) when performing the beamformed transmissions over the direct D2D communication.

Figure 5:
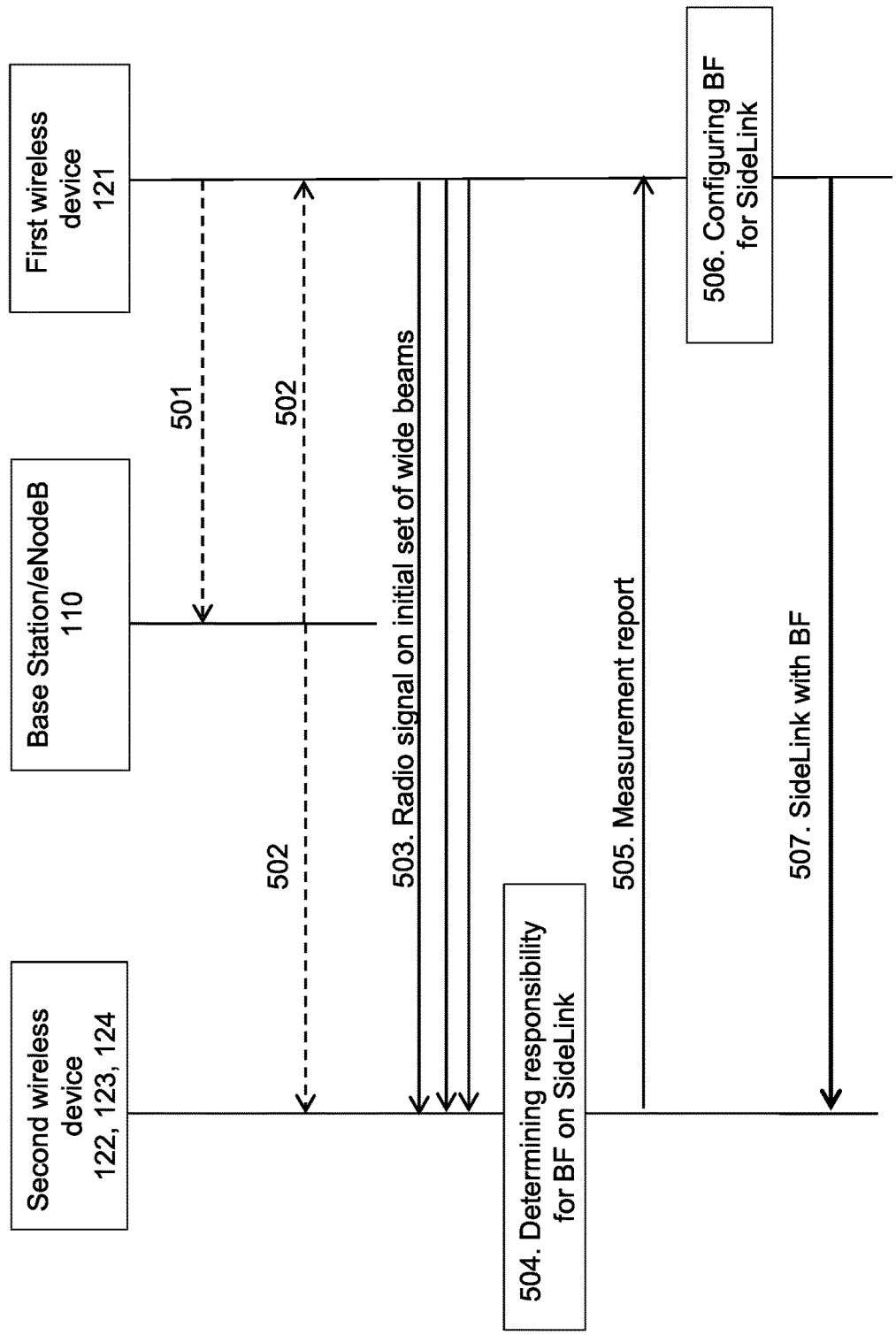
FIG. 5 is a signalling diagram illustrating embodiments of a first wireless device and at least one second wireless device in a wireless communications network.

FIG. 5 shows a signalling diagram illustrating embodiments of a first wireless device 121 and at least one second wireless device 122, 123, 124 in a wireless communications network 100 comprising a radio base station/eNB 110. The first wireless device 121 and the at least one second wireless device 122, 123, 124 may, for example, be two D2D/V2x wireless devices capable of communicating via SideLink over a PC5 interface. Both the first wireless device 121 and the at least one second wireless device 122, 123, 124 are also assumed to be configured with relevant transmit/receive, Tx/Rx, beamforming capabilities.

In this scenario, the first wireless device 121 may desire to communicate with any of the at least one second wireless device 122, 123, 124 within the coverage area of the radio base station/eNB 110. The first wireless device 121 and the at least one second wireless device 122, 123, 124 may be informed about the D2D/V2x capabilities of the radio base station/eNB 110 via System Information Block 18, SIB18, e.g. upon start-up or entry into the coverage area of the radio base station/eNB 110. The first wireless device 121, the radio base station/eNB 110, and the at least one second wireless device 122, 123, 124 may perform the following actions.

Action 501.

The first wireless device 121 may request the radio base station/eNB 110 for permission to use transmission resources for a SideLink transmission over the PC5 interface.

Action 502.

In response to the request, the radio base station/eNB 110 may indicate transmission resource allocations for the first wireless device 121 and the at least one second wireless device 122, 123, 124. This may be performed by the radio base station/eNB 110 by acknowledging the use of announcement over SideLink to the first wireless device 121 by using transmission resources selected by the radio base station/eNB 110. The radio base station/eNB 110 may also instruct the at least one second wireless device 122, 123, 124 to not use certain uplink, UL, transmission resources for its "own transmissions", since potential imminent incoming transmissions over the SideLink, allocated on UL resources, may be expected from the first wireless device 121.

Action 503.

The first wireless device 121 then transmits a radio signal on UL transmission resources dedicated to SideLink Sounding Reference Signals, SL-SRS, in some initial set of wide beams.

Action 504.

By receiving the radio signal in some initial set of wide beams, the at least one second wireless device 122, 123, 124 may determine that the responsibility of the beamforming on the SideLink is on the first wireless device 121. In response to this, the at least one second wireless device 122, 123, 124 may also identify the best Tx wide beam from the first wireless device 121, and its own best corresponding Rx wide beam.

Action 505.

The at least one second wireless device 122, 123, 124 may then transmit a first SideLink measurement report to the first wireless device 121 regarding the signal strength of the received UL SL-SRS signal on the set of received wide beams.

Action 506.

Upon receiving the first SideLink measurement report, the first wireless device 121 may configure the beamforming for the SideLink by adjusting its SideLink Tx wide beam according to the received first SideLink measurement report.

Optionally, the first wireless device 121 may here schedule and transmit further UL SL SRS signals for a selected set of SideLink Tx narrow beams that are within scope/range of the SideLink Tx wide-beam according to the received first SideLink measurement report. In this case, the at least one second wireless device 122, 123, 124 may measure the UL SL-SRS signal strength on the SideLink Tx narrow beams, and transmit a second SideLink measurement report to the first wireless device 121 regarding the signal strength of the received UL SL-SRS signal on the set of received the SideLink Tx narrow beams. Upon receiving the second SideLink measurement report, the first wireless device 121 may configure the beamforming for the SideLink by adjusting its SideLink Tx narrow beam according to the received second SideLink measurement report.

Action 507.

The first wireless device 121 may establish and perform beamforming transmissions over the SideLink towards the at least one second wireless device 122, 123, 124. This may be performed repeatedly, e.g. in some relevant repetition scheme over time and beam grid, transmitting UL SL-SRS signal for the SideLink Tx wide beam identified in Action 504. In this case, the at least one second wireless device 122, 123, 124 may loop through its Rx wide beams, or a subset thereof, identifying the best SideLink Rx wide beam. Here, the first wireless device 121 may also assume Rx/Tx wide beam correspondence from a SideLink perspective and select the best Rx wide beam also to be used for SideLink Tx wide beam. The first wireless device 121 is then ready to transmit data content according to the wide beam SideLink configuration to the at least one second wireless device 122, 123, 124.

It should also be noted that the same procedure as described above for the wide beam SideLink configuration in this Action 507 may also be performed for a narrow beam SideLink configuration in case the optional narrow beam refinement described in Action 506 was performed.

Figure 6:
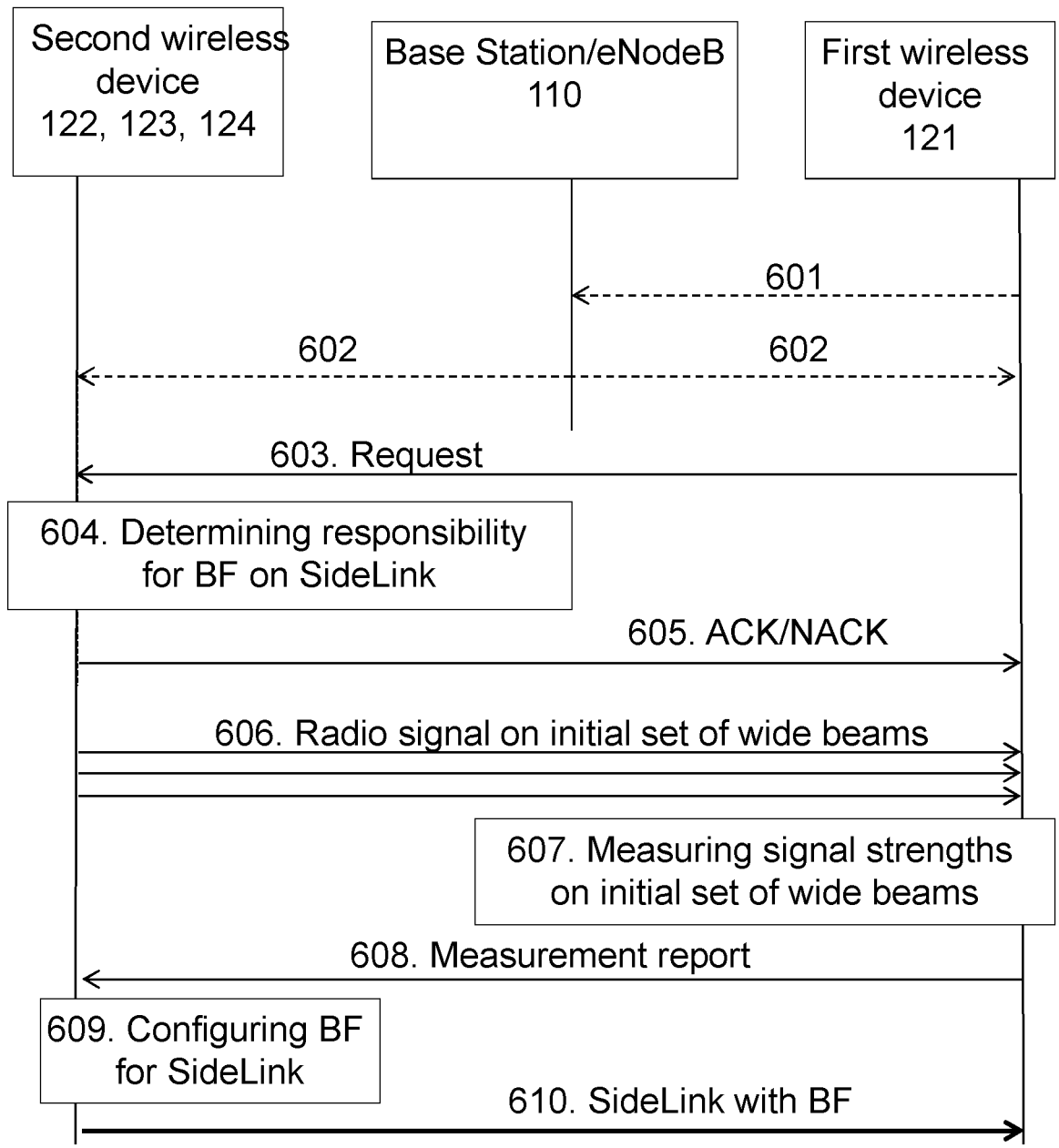
FIG. 6 is a signalling diagram illustrating further embodiments of a first wireless device and at least one second wireless device in a wireless communications network.

FIG. 6 shows another signalling diagram illustrating embodiments of a first wireless device 121 and at least one second wireless device 122, 123, 124 in a wireless communications network 100 comprising a radio base station/eNB 110. The scenario is the same as in FIG. 5, except that here it is assumed that the at least one second wireless device 122, 123, 124 is configured with relevant transmit/receive, Tx/Rx, beamforming capabilities, but the first wireless device 121 is less capable of managing beamforming transmissions, e.g. only having a single omni-directional Tx/Rx antenna. The first wireless device 121, the radio base station/eNB 110, and the at least one second wireless device 122, 123, 124 may perform the following actions.

Actions 601-602 are identical to the Action 501-502 described above with reference to FIG. 5.

Action 603.

The first wireless device 121 then transmits a request to the at least one second wireless device 122, 123, 124 to provide a beam management role in an upcoming communication, i.e. take the responsibility for beamformed transmissions over a SideLink communication with the first wireless device 121.

Action 604.

The at least one second wireless device 122, 123, 124 may determine whether or not it wants to assume the responsibility of beamforming transmissions on the SideLink towards the first wireless device 121.

Action 605.

The at least one second wireless device 122, 123, 124 may then transmit an acknowledgment, ACK, to the request in case it wants to assume the responsibility of beamforming transmissions on the SideLink towards the first wireless device 121, or transmit an non-acknowledgment, NACK, to the request in case it does not want to assume the responsibility of beamforming transmissions on the SideLink towards the first wireless device 121. If the at least one second wireless device 122, 123, 124 transmits a NACK, the first wireless device 121 may either terminate any further communication procedure in case the SideLink beam requirement is deemed mandatory for the intended communication purpose for the SideLink transmission. Optionally, the first wireless device 121 may proceed with a legacy D2D transmission procedure assuming omni-directional SideLink transmissions.

Action 606.

If the at least one second wireless device 122, 123, 124 transmits an ACK, the at least one second wireless device 122, 123, 124 takes on the responsibility for beamformed transmissions over a SideLink communication with the first wireless device 121. This means that the at least one second wireless device 122, 123, 124 may transmit a radio signal on UL transmission resources dedicated to SideLink Sounding Reference Signals, SL-SRS, in some initial set of wide beams towards the first wireless device 121.

Action 607.

In response to receiving the radio signal in some initial set of wide beams, the first wireless device 121 may also identify the best Tx wide beam from the at least one second wireless device 122, 123, 124, and its own best corresponding Rx wide beam, i.e. by measuring the signal strengths of the received UL SL-SRS signal on the set of received wide beams.

Action 608.

The first wireless device 121 may then transmit a first SideLink measurement report to the at least one second wireless device 122, 123, 124, regarding the signal strength of the received UL SL-SRS signal on the set of received wide beams.

Action 609.

Upon receiving the first SideLink measurement report, the at least one second wireless device 122, 123, 124 may configure the beamforming for the SideLink by adjusting its SideLink Tx wide beam according to the received first SideLink measurement report.

Optionally, the at least one second wireless device 122, 123, 124 may here schedule and transmit further UL SL SRS signals for a selected set of SideLink Tx narrow beams that are within scope/range of the SideLink Tx wide-beam according to the received first SideLink measurement report. In this case, the first wireless device 121 may measure the UL SL-SRS signal strength on the SideLink Tx narrow beams, and transmit a second SideLink measurement report to the at least one second wireless device 122, 123, 124 regarding the signal strength of the received UL SL-SRS signal on the set of received the SideLink Tx narrow beams. Upon receiving the second SideLink measurement report, the at least one second wireless device 122, 123, 124 may configure the beamforming for the SideLink by adjusting its SideLink Tx narrow beam according to the received second SideLink measurement report.

Action 610.

The at least one second wireless device 122, 123, 124 may then establish and perform beamforming transmissions over the SideLink towards the first wireless device 121. This may, for example, comprise repeatedly, e.g. in some relevant repetition scheme over time and beam grid, transmitting UL SL-SRS signal for the SideLink Tx wide beam identified in Action 607. In this case, the first wireless device 121 may respond with corresponding measurement reports. The at least one second wireless device 122, 123, 124 is then ready to transmit data content according to the wide beam SideLink configuration to the first wireless device 121.

It should also be noted that the same procedure as described above for the wide beam SideLink configuration in this Action 610 may also be performed for a narrow beam SideLink configuration in case the optional narrow beam refinement described in Action 609 was performed. Furthermore, for short burst-like transmissions, such as, e.g. a sensor status request from the first wireless device 121 to the at least one second wireless device 122, 123, 124, time and resources may be saved by repeatedly performed steps in this Action 610. This information may be comprised in the request transmitted in Action 603. In other words, if the first wireless device 121 may ask for a small amount of data, but may still benefit from the beamforming capabilities of the at least one second wireless device 122, 123, 124.

Some implementation scenarios wherein the embodiments described herein may be advantageously used are described below.

According to a first scenario, the embodiments herein may be used to establish a minimum set of beam management or beamforming capabilities, i.e. a typical arrangement could end up in a situation where both the first wireless device 121 and at least one second wireless device 122, 123, 124 hold certain capabilities, and where a minimum/smallest/common set of beam management capabilities considered critical for a specific SideLink communication must be agreed between the first wireless device 121 and at least one second wireless device 122, 123, 124.

According to a second scenario, the embodiments herein may be used to consider communicating vehicles' direction of travel; that is, the first wireless device 121 and at least one second wireless device 122, 123, 124 could also execute said negotiation considering an expected travel route and an expected time duration that the first wireless device 121 and the at least one second wireless device 122, 123, 124 expects to be accessible for intended SideLink transmission. According to one example, the first wireless device 121 in a vehicle A may hold a travel route indicating certain beam directions to the at least one second wireless device 122, 123, 124 in vehicle B. For example, vehicle A may according to a travel route overtake vehicle B. Here, the first wireless device 121 in vehicle A may during its communication with the at least one second wireless device 122, 123, 124 in vehicle B initially makes use of its front-pointing set of beams. Then, during the passage of vehicle B, the first wireless device 121 in vehicle A may use its right-side pointing beams. After that, the first wireless device 121 in vehicle A may use its aft-pointing beams after the passage of vehicle B.

According to a third scenario, the embodiments herein may be used to deduct a direction of the intended data transmission. In this case, the direction of the intended data transmission may further be used to distinguish and help to identify what roles each of the wireless devices is to have in beamforming transmission over the SideLink communication link. For example, assuming that the first wireless device 121 desires to utilize an inbound data stream from at least one second wireless device 122, 123, 124, such as, neighbouring wireless devices, e.g. cameras, LIDARs, etc., the Actions 603-605 described above with reference to FIG. 6 may also comprise the service reason for the SideLink transmission request, which typically may indicate that the SideLink communication scenario would benefit from the at least one second wireless device 122, 123, 124 to adopt the beam management role, i.e. perform beamforming transmissions, in the targeted data direction in the SideLink communication.

According to a third scenario, the embodiments herein may be used to deduct a direction of intended data transmission in combination with the travel direction of the first wireless device 121. In this example, it is assumed that the first wireless device 121 desires to utilize an outbound data stream towards at least one second wireless device 122, 123, 124, e.g. provide other vehicle sensors with data in terms of brake actuation information. In this case, given that the first wireless device 121 holds the required beam management capabilities for performing beamforming transmissions, the Actions 502-506 described above with reference to FIG. 5 may further comprise the first wireless device 121 informing the at least one second wireless device 122, 123, 124 of an upcoming beamformed SideLink communication, i.e. instructing the at least one second wireless device 122, 123, 124 to start listening for UL SL-SRS signals. Here, the first wireless device 12 may also deduct that, given its current travel direction in a vehicle A, the brake actuation information is primarily of use for other vehicles located behind the vehicle A. Hence, it would make most sense to transmit using the rear-facing antenna of the wireless device 121 in vehicle A, i.e. transmit the UL SL-SRS signal in a selected rear-facing set of wide or narrow beams.

In a similar manner, the at least one second wireless device 122, 123, 124 may here be thought of in terms of a vehicle B desiring to address the vehicle A located in front of vehicle B using the front-facing antennas of the at least one second wireless device 122, 123, 124 in vehicle B. One area of application may typically be when a rescue vehicle is approaching a road crossing. In this context, it may be advantageous for the at least one second wireless device 122, 123, 124 in the approaching vehicle B to announce its approach to the crossing using its front-facing antennas, and correspondingly, transmit the UL SL-SRS signal in the same front-facing beam direction.

Figure 7:
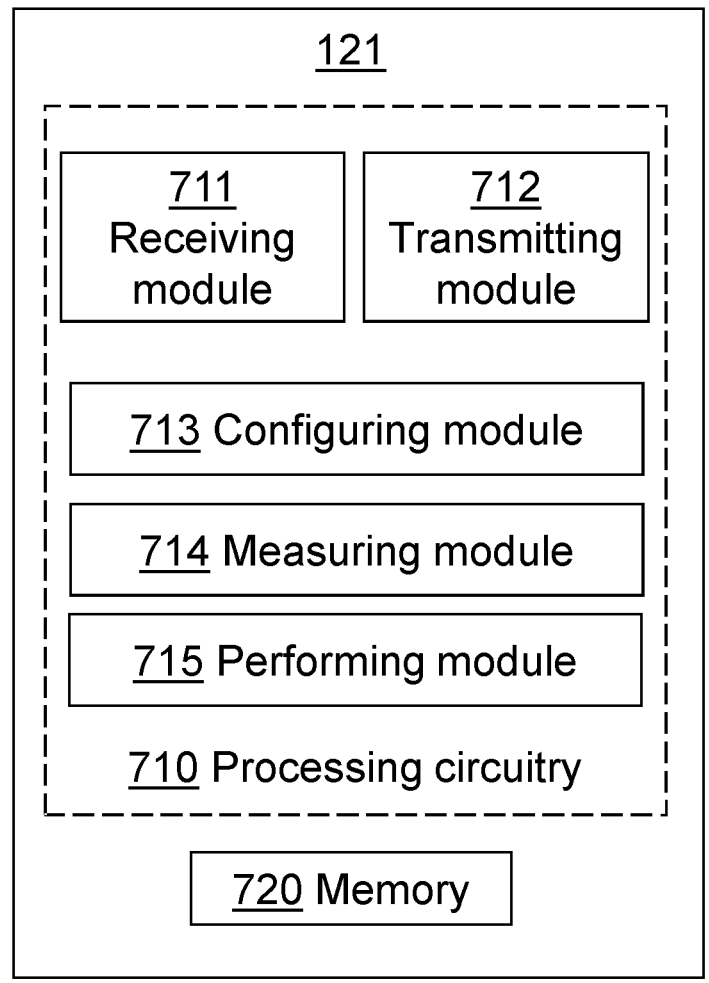
FIG. 7 is a block diagram depicting embodiments of a first wireless device.

To perform the method actions in a first wireless device 121 for handling beamformed transmissions between the first wireless device 121 and at least one second wireless device 122, 123, 124 over a direct device-to-device, D2D, communication link, the first wireless device 121 may comprise the following arrangement depicted in FIG. 7. FIG. 7 shows a schematic block diagram of embodiments of a first wireless device 121. The embodiments of the first wireless device 121 described herein may be considered as independent embodiments or may be considered in any combination with each other to describe non-limiting examples of the example embodiments described herein.

The first wireless device 121 may comprise processing circuitry 710, a memory 720 and at least one antenna (not shown). The processing circuitry 710 may also comprise a receiving module 711 and a transmitting module 712. The receiving module 711 and the transmitting module 712 may comprise Radio Frequency, RF, circuitry and baseband processing circuitry capable of transmitting a radio signal in the wireless communications network 100. The receiving module 711 and the transmitting module 712 may also form part of a single transceiver. It should also be noted that some or all of the functionality described in the embodiments above as being performed by the first wireless device 121 may be provided by the processing circuitry 710 executing instructions stored on a computer-readable medium, such as, e.g. the memory 720 shown in FIG. 7. Alternative embodiments of the first wireless device 121 may comprise additional components, such as, for example, a configuring module 713, a measuring module 714, and a performing module 715, each responsible for providing its respective functionality necessary to support the embodiments described herein.

The first wireless device 121 or processing circuitry 710 is configured to, or may comprise the transmitting module 712 configured to, transmit a radio signal towards the at least one second wireless device 122, 123, 124 indicating that the first wireless device 121 is, or that the at least one second wireless device 122, 123, 124 has an option to be, responsible for beamforming of transmissions over the direct D2D communication link. Also, the first wireless device 121 or processing circuitry 710 is configured to, or may comprise the receiving module 711 configured to, receive information from the at least one second wireless device 122, 123, 124 indicating which of the first wireless device 121 or the at least one second wireless device 122, 123, 124 is to be responsible for beamforming of transmissions over the direct D2D communication link. Further, the first wireless device 121 or processing circuitry 710 is configured to, or may comprise the configuring module 713 configured to, configure, based on the received information, which of the first wireless device 121 or the at least one second wireless device 122, 123, 124 is to be responsible for beamforming of transmissions over the direct D2D communication link. In some embodiments, the first wireless device 121 or processing circuitry 710 may be configured to, or may comprise the performing module 715 configured to, perform beamformed transmissions towards the at least one second wireless device 122, 123, 124 over the direct D2D communication link based on the configuration.

In some embodiments, the first wireless device 121 or processing circuitry 710 may be configured to, or may comprise the transmitting module 712 configured to, transmit the radio signal in an initial set of wide beams over the direct D2D communication link to indicate to the at least one second wireless device 122, 123, 124 that the first wireless device 121 is to be responsible for the beamforming of transmissions over the direct D2D communication link. In this case, according to some embodiments, the received information from the at least one second wireless device 122, 123, 124 may comprise a measurement report on the received signal strength on the initial set of wide beams transmitted from the first wireless device 121. The measurement report may indicate to the first wireless device 121 that the first wireless device 121 is to be responsible for the beamforming of transmissions over the direct D2D communication link. Here, the first wireless device 121 or processing circuitry 710 may be configured to, or may comprise the configuring module 713 configured to, configure the initial set of wide beams for the direct D2D communication link based on the received measurement report from the at least one second wireless device 122, 123, 124.

In some embodiments, the transmitted radio signal may comprise a request for the at least one second wireless device 122, 123, 124 to be responsible for the beamforming of transmissions over the direct D2D communication link. In this case, according to some embodiments, the request may further comprises wide-beam characteristics or narrow-beam characteristics indicating absolute or relative directions of one or more antennas of the first wireless device 121 in respect of the current movement direction of at least one second wireless device 122, 123, 124. Furthermore, in some embodiments, the received information from the at least one second wireless device 122, 123, 124 may comprise an acknowledgement, ACK, or non-acknowledgement, NACK, of the request for the at least one second wireless device 122, 123, 124 to be responsible for beamforming of transmissions over the direct D2D communication link. Here, in case a non-acknowledgement, NACK, of the request is received from the at least one second wireless device 122, 123, 124, the first wireless device 121 or processing circuitry 710 may be configured to, or may comprise the configuring module 713 configured to, either terminate the direct D2D communication link if beamformed transmissions are mandated in the first wireless device 121, or configure the direct D2D communication link for non-beamformed transmissions if beamformed transmissions are optional in the first wireless device 121. Optionally, in case an acknowledgement, ACK, of the request is received from the at least one second wireless device 122, 123, 124, the first wireless device 121 or processing circuitry 710 may be configured to, or may comprise the receiving module 711 configured to, receive, from the at least one second wireless device 122, 123, 124 over the direct D2D communication link, a radio signal in an initial set of wide beams. In this case, the first wireless device 121 or processing circuitry 710 may be configured to, or may comprise the measuring module 714 configured to, measure the received signal strengths on the initial set of wide beams. Further, the first wireless device 121 or processing circuitry 710 may be configured to, or may comprise the transmitting module 712 configured to, transmit, to the at least one second wireless device 122, 123, 124 over the direct D2D communication link, a measurement report on the received signal strengths on the initial set of wide beams transmitted from the first wireless device 121.

In some embodiments, the transmitted radio signal may comprise an indication that no subsequent narrow beam refinement is required in the beamforming of transmissions between the first wireless device 121 and the at least one second wireless device 122, 123, 124 over the direct D2D communication. Also, in some embodiments, the first wireless device 121 or processing circuitry 710 may be configured to, or may comprise the transmitting module 712 configured to, perform the transmitting on Sounding Reference Signal, SRS, transmission resources of the direct D2D communication link. Similarly, the first wireless device 121 or processing circuitry 710 may be configured to, or may comprise the receiving module 711 configured to, perform the receiving on Sounding Reference Signal, SRS, transmission resources of the direct D2D communication link.

Furthermore, the embodiments for handling beamformed transmissions between the first wireless device 121 and at least one second wireless device 122, 123, 124 over a direct D2D communication link described above may be implemented through one or more processors, such as the processing circuitry 710 in the first wireless device 121 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the first wireless device 121. The computer program code may e.g. be provided as pure program code in the first wireless device 121 or on a server and downloaded to the first wireless device 121. Thus, it should be noted that the modules of the first wireless device 121 may in some embodiments be implemented as computer programs stored in memory, e.g. in the memory modules 720 in FIG. 7, for execution by processors or processing modules, e.g. the processing circuitry 710 of FIG. 7.

Those skilled in the art will also appreciate that the processing circuitry 710 and the memory 720 described above may refer to a combination of analog and digital circuits, and/or one or more processors configured with software and/or firmware, e.g. stored in a memory, that when executed by the one or more processors such as the processing circuitry 720 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 8:
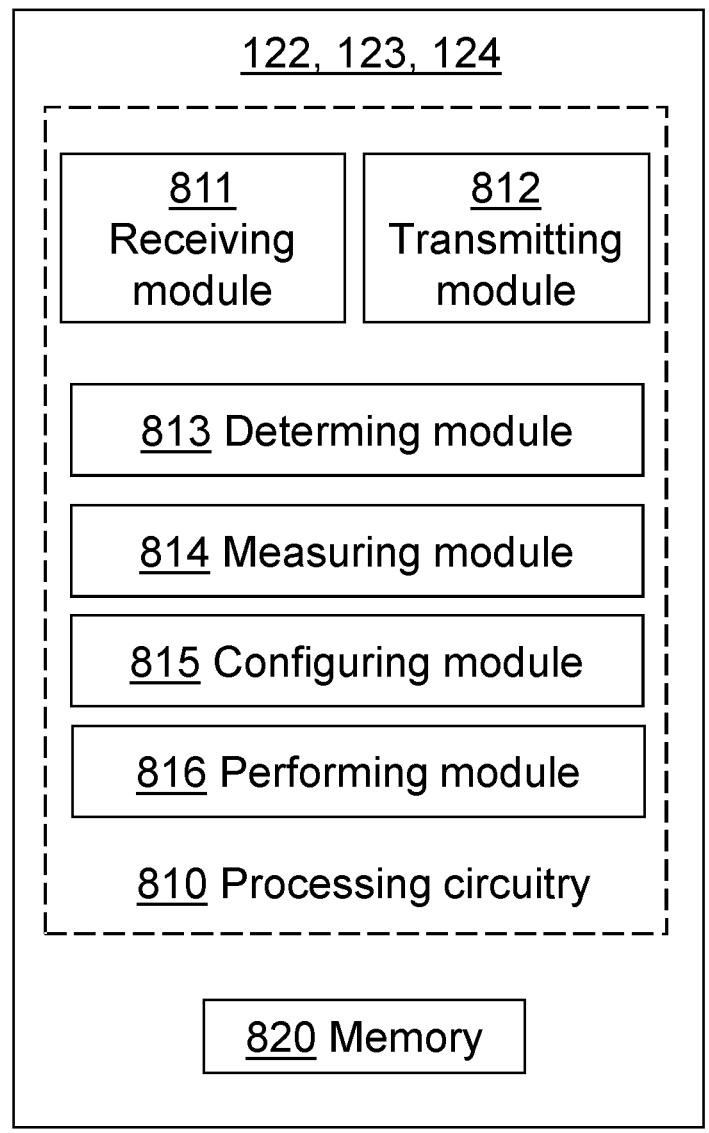
FIG. 8 is a block diagram depicting embodiments of a second wireless device.

To perform the method actions in a second wireless device 122, 123, 124 for handling beamformed transmissions between the second wireless device 122, 123, 124 and a first wireless device 121 over a direct device-to-device, D2D, communication link, the second wireless device 122, 123, 124 may comprise the following arrangement depicted in FIG. 8. FIG. 8 shows a schematic block diagram of embodiments of a second wireless device 122, 123, 124. The embodiments of the second wireless device 122, 123, 124 described herein may be considered as independent embodiments or may be considered in any combination with each other to describe non-limiting examples of the example embodiments described herein.

The second wireless device 122, 123, 124 may comprise processing circuitry 810, a memory 820 and at least one antenna (not shown). The processing circuitry 810 may also comprise a receiving module 811 and a transmitting module 812. The receiving module 811 and the transmitting module 812 may comprise Radio Frequency, RF, circuitry and baseband processing circuitry capable of transmitting a radio signal in the wireless communications network 100. The receiving module 811 and the transmitting module 812 may also form part of a single transceiver. It should also be noted that some or all of the functionality described in the embodiments above as being performed by the second wireless device 122, 123, 124 may be provided by the processing circuitry 810 executing instructions stored on a computer-readable medium, such as, e.g. the memory 820 shown in FIG. 8. Alternative embodiments of the second wireless device 122, 123, 124 may comprise additional components, such as, for example, a determining module 813, a measuring module 814, and a configuring module 815, each responsible for providing its respective functionality necessary to support the embodiments described herein.

The second wireless device 122, 123, 124 or processing circuitry 810 is configured to, or may comprise the receiving module 811 configured to, receive a radio signal from the first wireless device 121 indicating that the first wireless device 121 is, or that the second wireless device 122, 123, 124 has an option to be, responsible for beamforming of transmissions over the direct D2D communication link. Also, the second wireless device 122, 123, 124 or processing circuitry 810 is configured to, or may comprise the determining module 813 configured to, determine which of the first wireless device 121 or the second wireless device 122, 123, 124 is to be responsible for beamforming of transmissions over the direct D2D communication link. Further, the second wireless device 122, 123, 124 or processing circuitry 810 is configured to, or may comprise the transmitting module 812 configured to, transmit information to the first wireless device 121 indicating which of the first wireless device 121 or the second wireless device 122, 123, 124 is to be responsible for beamforming of transmissions over the direct D2D communication link. In some embodiments, the second wireless device 122, 123, 124 or processing circuitry 810 may be configured to, or may comprise the performing module 816 configured to, perform beamformed transmissions towards the first wireless device 121 over the direct D2D communication link.

In some embodiments, the second wireless device 122, 123, 124 or processing circuitry 810 may be configured to, or may comprise the receiving module 811 configured to, receive the radio signal in an initial set of wide beams over the direct D2D communication link. This indicates to the second wireless device 122, 123, 123 that the first wireless device 121 is to be responsible for the beamforming of transmissions over the direct D2D communication link. In this case, according to some embodiments, the second wireless device 122, 123, 124 or processing circuitry 810 may be configured to, or may comprise the measuring module 814 configured to, measure the received signal strengths on the initial set of wide beams. Here, the second wireless device 122, 123, 124 or processing circuitry 810 may be configured to, or may comprise the transmitting module 812 configured to, transmit information comprising a measurement report on the received signal strengths of the radio signal on the initial set of wide beams, wherein the measurement report indicates to the first wireless device 121 that the first wireless device 121 is to be responsible for the beamforming of transmissions over the direct D2D communication link.

In some embodiments, the received radio signal comprises a request for the second wireless device 122, 123, 124 to be responsible for the beamforming of transmissions over the direct D2D communication link. Also, according to some embodiments, the request further comprises wide-beam characteristics or narrow-beam characteristics indicating absolute or relative directions of one or more antennas of the first wireless device 121 in respect of the current movement direction of the second wireless device 122, 123, 124. Here, according to some embodiments, the second wireless device 122, 123, 124 or processing circuitry 810 may be configured to, or may comprise the transmitting module 812 configured to, transmit an acknowledgement, ACK, of the request if the second wireless device 122, 123, 124 has determined that it is to be responsible for beamforming of transmissions over the direct D2D communication link, or a non-acknowledgement, NACK, of the request if the second wireless device 122, 123, 124 has determined that it is not to be responsible for beamforming of transmissions over the direct D2D communication link. According to some embodiments, in case an acknowledgement, ACK, of the request is transmitted from the second wireless device 122, 123, 124, the second wireless device 122, 123, 124 or processing circuitry 810 may be configured to, or may comprise the transmitting module 812 configured to, transmit, to the first wireless device 122, 123, 124 over the direct D2D communication link, a radio signal in an initial set of wide beams. In this case, the second wireless device 122, 123, 124 or processing circuitry 810 may be configured to, or may comprise the receiving module 811 configured to, receive, from the first wireless device 122, 123, 124 over the direct D2D communication link, a measurement report on the received signal strengths on the initial set of wide beams transmitted from the second wireless device 122, 123, 124. Here, the second wireless device 122, 123, 124 or processing circuitry 810 may be configured to, or may comprise the configuring module 815 configured to, configure the initial set of wide beams for the direct D2D communication link based on the received measurement report from the first wireless device 121.

In some embodiments, the received radio signal may comprise an indication that no subsequent narrow beam refinement is required in the beamforming of transmissions between the second wireless device 122, 123, 124 and the first wireless device 121 over the direct D2D communication. Also, in some embodiments, the second wireless device 122, 123, 124 or processing circuitry 810 may be configured to, or may comprise the transmitting module 812 configured to, perform the transmitting on Sounding Reference Signal, SRS, transmission resources of the direct D2D communication link. Similarly, the second wireless device 122, 123, 124 or processing circuitry 810 may be configured to, or may comprise the receiving module 811 configured to, perform the receiving on Sounding Reference Signal, SRS, transmission resources of the direct D2D communication link. Furthermore, the embodiments for handling beam-formed transmissions between the second wireless device 122, 123, 124 and a first wireless device 121 over a direct D2D communication link described above may be implemented through one or more processors, such as the processing circuitry 810 in the second wireless device 122, 123, 124 depicted in FIG. 8, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 810 in the second wireless device 122, 123, 124. The computer program code may e.g. be provided as pure program code in the second wireless device 122, 123, 124 or on a server and downloaded to the second wireless device 122, 123, 124. Thus, it should be noted that the modules of the second wireless device 122, 123, 124 may in some embodiments be implemented as computer programs stored in memory, e.g. in the memory modules 820 in FIG. 8, for execution by processors or processing modules, e.g. the processing circuitry 810 of FIG. 8.

Those skilled in the art will also appreciate that the processing circuitry 810 and the memory 820 described above may refer to a combination of analog and digital circuits, and/or one or more processors configured with software and/or firmware, e.g. stored in a memory, that when executed by the one or more processors such as the processing circuitry 820 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Additional Aspects

According to a first additional aspect of the embodiments described herein, it is also presented a method implemented in a communication system including a host computer, a base station and a first wireless device 121 (referred to also as UE in this section), the method comprising: at the host computer, receiving user data transmitted to the base station from the UE, wherein the UE transmit a radio signal towards the at least one second wireless device indicating that the first wireless device is, or that the at least one second wireless device has an option to be, responsible for beamforming of transmissions over the direct D2D communication link, receive information from the at least one second wireless device indicating which of the UE or the at least one second wireless device is to be responsible for beamforming of transmissions over the direct D2D communication link, and configure, based on the received information, which of the UE or the at least one second wireless device is to be responsible for beamforming of transmissions over the direct D2D communication link. The method may further comprise: at the UE, providing the user data to the base station. The method may further comprise: at the UE, executing a client application, thereby providing the user data to be transmitted; and at the host computer, executing a host application associated with the client application. The method may further comprise: at the UE, executing a client application; and at the UE, receiving input data to the client application, the input data being provided at the host computer by executing a host application associated with the client application, wherein the user data to be transmitted is provided by the client application in response to the input data.

According to a second additional aspect of the embodiments described herein, it is also presented a communication system including a host computer comprising: a communication interface configured to receive user data originating from a transmission from a user equipment (UE) to a base station, wherein the UE comprises a radio interface and processing circuitry, the UE's processing circuitry configured to: transmit a radio signal towards the at least one second wireless device indicating that the first wireless device is, or that the at least one second wireless device has an option to be, responsible for beamforming of transmissions over the direct D2D communication link, receive information from the at least one second wireless device indicating which of the UE or the at least one second wireless device is to be responsible for beamforming of transmissions over the direct D2D communication link, and configure, based on the received information, which of the UE or the at least one second wireless device is to be responsible for beamforming of transmissions over the direct D2D communication link. The communication system may further include the UE. The communication system may further include the base station, wherein the base station comprises a radio interface configured to communicate with the UE and a communication interface configured to forward to the host computer the user data carried by a transmission from the UE to the base station. A communication system described above, wherein: the processing circuitry of the host computer is configured to execute a host application; and the UE's processing circuitry is configured to execute a client application associated with the host application, thereby providing the user data may also be provided. A communication system described above, wherein: the processing circuitry of the host computer is configured to execute a host application, thereby providing request data; and the UE's processing circuitry is configured to execute a client application associated with the host application, thereby providing the user data in response to the request data may also be provided.

According to a third additional aspect of the embodiments described herein, it is also presented a method implemented in a communication system including a host computer, a base station and a user equipment (UE), the method comprising: at the host computer, providing user data; and at the host computer, initiating a transmission carrying the user data to the UE via a cellular network comprising the base station, wherein the UE transmit a radio signal towards the at least one second wireless device indicating that the first wireless device is, or that the at least one second wireless device has an option to be, responsible for beamforming of transmissions over the direct D2D communication link, receive information from the at least one second wireless device indicating which of the UE or the at least one second wireless device is to be responsible for beamforming of transmissions over the direct D2D communication link, and configure, based on the received information, which of the UE or the at least one second wireless device is to be responsible for beamforming of transmissions over the direct D2D communication link. The method may further comprise: at the UE, receiving the user data from the base station.

According to a fourth additional aspect of the embodiments described herein, it is also presented a communication system including a host computer comprising:

processing circuitry configured to provide user data; and a communication interface configured to forward user data to a cellular network for transmission to a user equipment (UE), wherein the UE comprises a radio interface and processing circuitry, the UE's processing circuitry configured to transmit a radio signal towards the at least one second wireless device indicating that the first wireless device is, or that the at least one second wireless device has an option to be, responsible for beamforming of transmissions over the direct D2D communication link, receive information from the at least one second wireless device indicating which of the UE or the at least one second wireless device is to be responsible for beamforming of transmissions over the direct D2D communication link, and configure, based on the received information, which of the UE or the at least one second wireless device is to be responsible for beamforming of transmissions over the direct D2D communication link. The communications system may further include the UE. The communications system as described above, wherein the cellular network further includes a base station configured to communicate with the UE may also be provided. The communications system as described above, wherein: the processing circuitry of the host computer is configured to execute a host application, thereby providing the user data; and the UE processing circuitry is configured to execute a client application associated with the host application.

Figure 9:
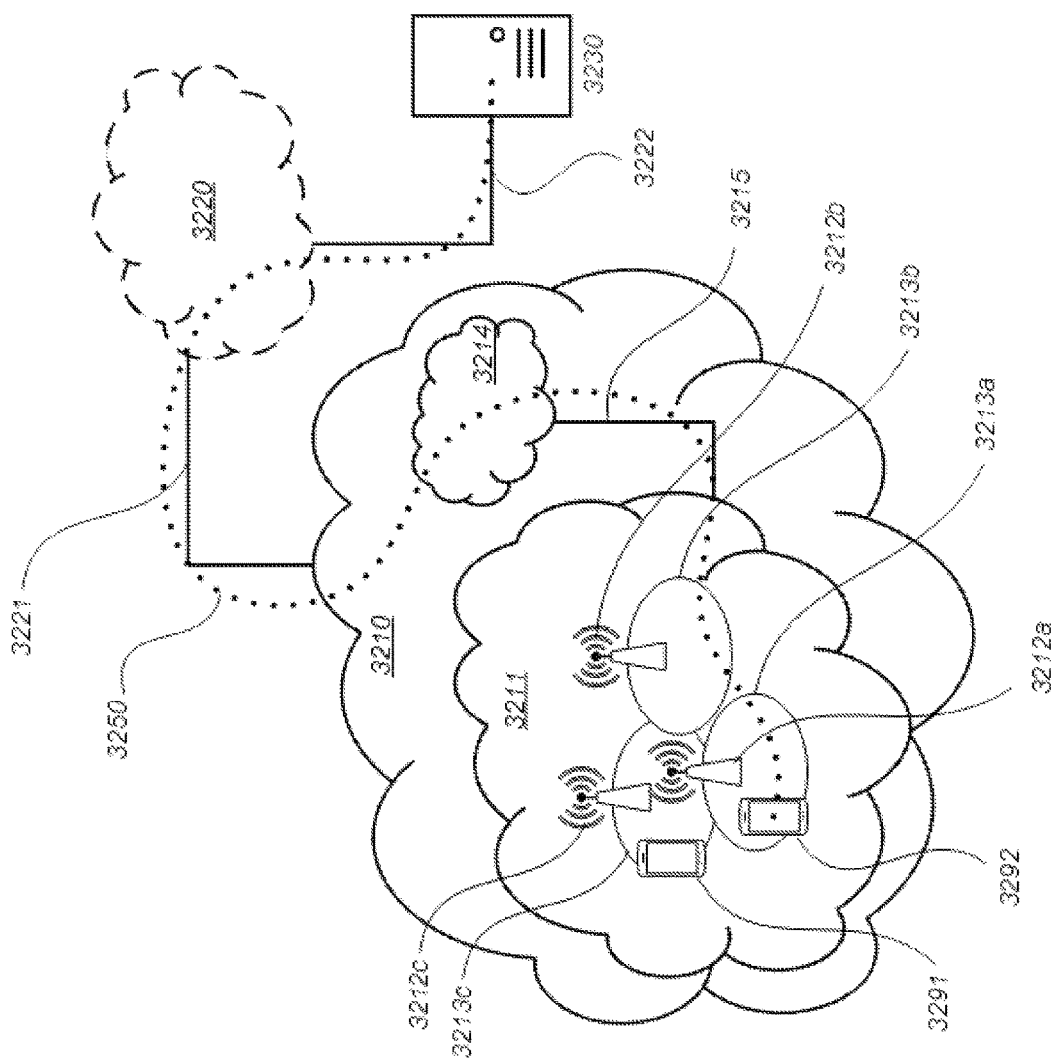
FIG. 9 is a block diagram depicting embodiments of a communication system.

With reference to FIG. 9, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 9 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 10) served by the base station 3320. The communication interface 3326 may be configured to facilitate a connection 3360 to the host computer 3310. The connection 3360 may be direct or it may pass through a core network (not shown in FIG. 10) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 10:
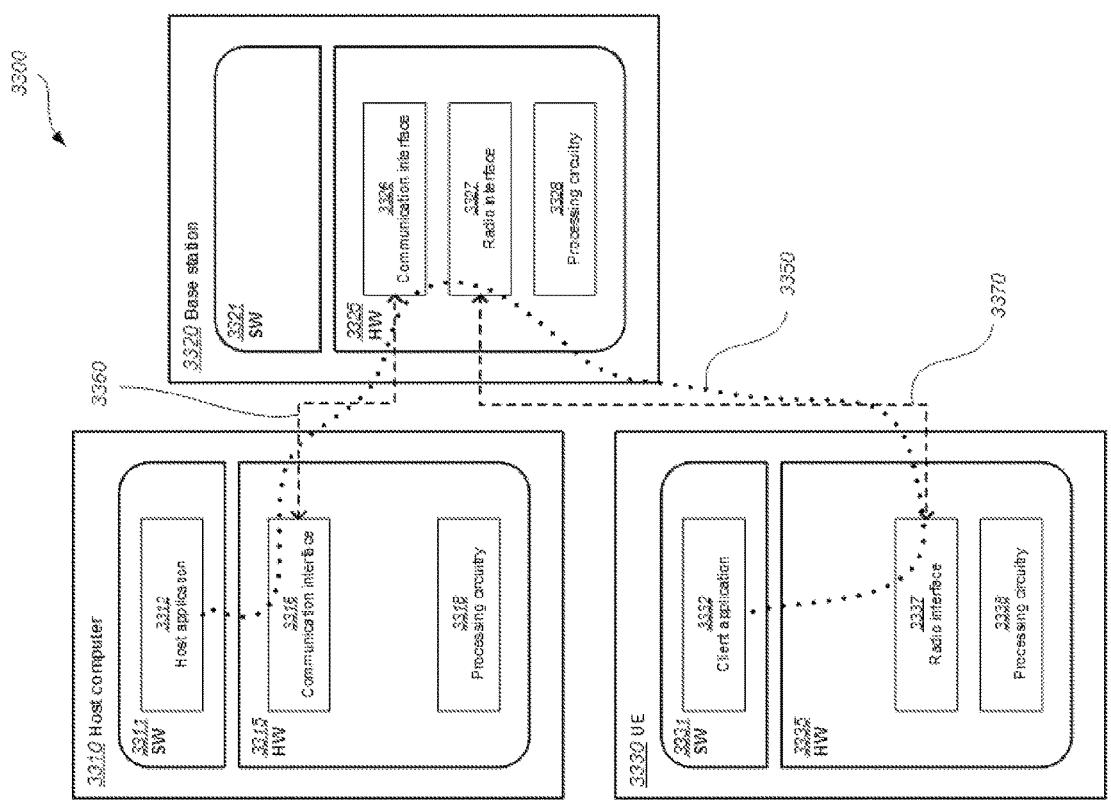
FIG. 10 is a block diagram depicting embodiments of a UE, a base station, and a host computer discussed in a communication system of FIG. 9.

It is noted that the host computer 3310, base station 3320 and UE 3330 illustrated in FIG. 10 may be identical to the host computer 3230, one of the base stations 3212*a*, 3212*b*, 3212*c* and one of the UEs 3291, 3292 of FIG. 9, respectively. This is to say, the inner workings of these entities may be as shown in FIG. 10 and independently, the surrounding network topology may be that of FIG. 9.

In FIG. 10, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the use of direct V2x/D2D communication links between wireless devices in a wireless communications network to, e.g. offload traffic from the core network, and thereby provide benefits such as reducing the energy and cost particularly for supporting proximity-based services, ProSe.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 11 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 34 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9-10. For simplicity of the present disclosure, only drawing references to FIG. 12 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 13, 14:
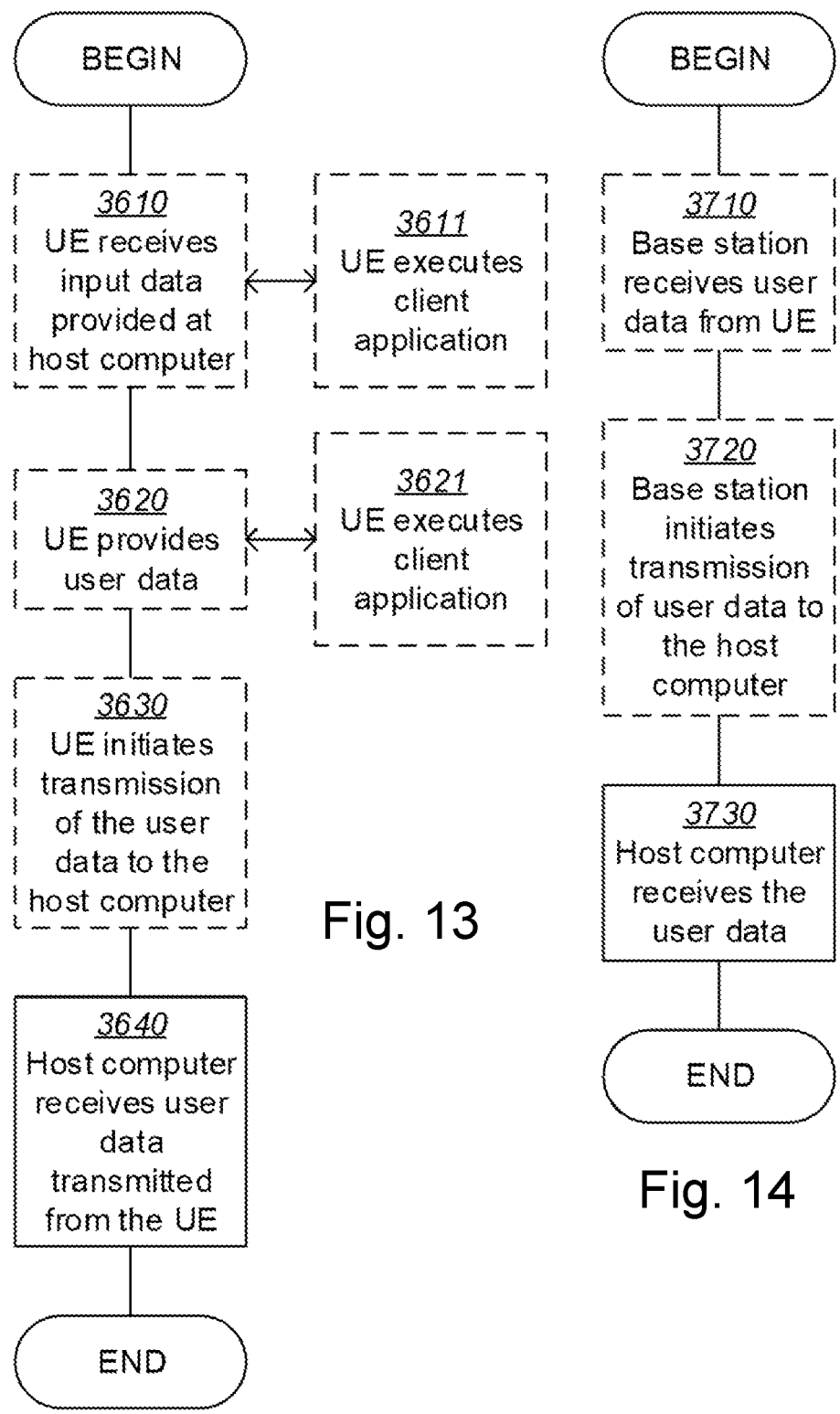
FIG. 13 is a flowchart illustrating a method implemented in a communication system, in accordance with one embodiment.
FIG. 14 is a flowchart illustrating a method implemented in a communication system, in accordance with one embodiment.

FIG. 13 is a flowchart illustrating a method implemented in a communication system, in accordance with one embodiment. The communication system includes a host computer, a base station and a UE which may be those described with reference to FIGS. 9-10. For simplicity of the present disclosure, only drawing references to FIG. 13 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9-10. For simplicity of the present disclosure, only drawing references to FIG. 14 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

ABBREVIATIONS

D2D Device-to-Device
V2x Vehicle-to-Everything
DL Downlink
eNodeB/eNB evolved NodeB
LTE Long Term Evolution
PCx Interface for D2D
ProSe Proximity-based Services
RRC Radio Resource Control
RX Receive SL SideLink
SRS Sounding Reference Signal
TX Transmit
UE User Equipment
UL Uplink

The invention claimed is:

1. A method performed by a first wireless device for handling beamformed transmissions between the first wireless device and at least one second wireless device over a direct device-to-device, D2D, communication link, the method comprising
- transmitting a radio signal towards the at least one second wireless device indicating that the first wireless device is, or that the at least one second wireless device has an option to be, responsible for beamforming of transmissions over the direct D2D communication link;
- receiving information from the at least one second wireless device indicating which of the first wireless device or the at least one second wireless device is to be responsible for beamforming of transmissions over the direct D2D communication link; and
- configuring, based on the received information, which of the first wireless device or the at least one second wireless device is to be responsible for beamforming of transmissions over the direct D2D communication link.

2. The method according to claim 1, further comprising performing beamformed transmissions towards the at least one second wireless device over the direct D2D communication link based on the configuration.

3. The method according to claim 1, wherein transmitting the radio signal in an initial set of wide beams over the direct D2D communication link indicates to the at least one second wireless device that the first wireless device is to be responsible for the beamforming of transmissions over the direct D2D communication link.

4. The method according to claim 3, wherein the received information from the at least one second wireless device comprises a measurement report on the received signal strength on the initial set of wide beams transmitted from the first wireless device, said measurement report indicating to the first wireless device that the first wireless device is to be responsible for the beamforming of transmissions over the direct D2D communication link, and wherein the configuring comprises configuring the initial set of wide beams for the direct D2D communication link based on the received measurement report from the at least one second wireless device.

5. The method according to claim 1, wherein the transmitted radio signal comprises a request for the at least one second wireless device to be responsible for the beamforming of transmissions over the direct D2D communication link.

6. The method according to claim 5, wherein the request further comprises wide-beam characteristics or narrow-beam characteristics indicating absolute or relative directions of one or more antennas of the first wireless device in respect of the current movement direction of at least one second wireless device.

7. The method according to claim 5, wherein the received information from the at least one second wireless device comprises an acknowledgement (ACK) or non-acknowledgement (NACK) of the request for the at least one second wireless device to be responsible for beamforming of transmissions over the direct D2D communication link.

8. The method according to claim 1, wherein the transmitted radio signal comprises an indication that no subsequent narrow beam refinement is required in the beamforming of transmissions between the first wireless device and the at least one second wireless device over the direct D2D communication.

9. A first wireless device for handling beamformed transmissions between the first wireless device and at least one second wireless device over a direct device-to-device, D2D, communication link, the first wireless device comprising a processor and a memory, wherein the memory is containing instructions executable by the processor, causing the first wireless device to:
- transmit a radio signal towards the at least one second wireless device indicating that the first wireless device is, or that the at least one second wireless device has an option to be, responsible for beamforming of transmissions over the direct D2D communication link,
- receive information from the at least one second wireless device indicating which of the first wireless device or the at least one second wireless device is to be responsible for beamforming of transmissions over the direct D2D communication link, and
- configure, based on the received information, which of the first wireless device or the at least one second wireless device is to be responsible for beamforming of transmissions over the direct D2D communication link.

10. The first wireless device according to claim 9, further configured to perform beamformed transmissions towards the at least one second wireless device over the direct D2D communication link based on the configuration.

11. A method performed by a second wireless device for handling beamformed transmissions between the second wireless device and a first wireless device over a direct device-to-device, D2D, communication link, the method comprising
- receiving a radio signal from the first wireless device indicating that the first wireless device is, or that the second wireless device has an option to be, responsible for beamforming of transmissions over the direct D2D communication link;
- determining which of the first wireless device or the second wireless device is to be responsible for beamforming of transmissions over the direct D2D communication link; and
- transmitting information to the first wireless device indicating which of the first wireless device or the second wireless device is to be responsible for beamforming of transmissions over the direct D2D communication link.

12. The method according to claim 11, further comprising performing beamformed transmissions towards the first wireless device over the direct D2D communication link.

13. The method according to claim 11, wherein receiving the radio signal in an initial set of wide beams over the direct D2D communication link indicates to the second wireless device that the first wireless device is to be responsible for the beamforming of transmissions over the direct D2D communication link.

14. The method according to claim 12, wherein the determining further comprises measuring the received signal strengths on the initial set of wide beams, and the transmitting further comprises transmitting information comprising a measurement report on the received signal strengths of the radio signal on the initial set of wide beams, wherein the measurement report indicates to the first wireless device that the first wireless device (121) is to be responsible for the beamforming of transmissions over the direct D2D communication link.

15. The method according to claim 11, wherein the received radio signal comprises a request for the second wireless device to be responsible for the beamforming of transmissions over the direct D2D communication link.

16. The method according to claim 15, wherein the request further comprises wide-beam characteristics or narrow-beam characteristics indicating absolute or relative directions of one or more antennas of the first wireless device in respect of the current movement direction of the second wireless device.

17. The method according to claim 15, wherein the transmitted information comprise an acknowledgement (ACK) of the request if the second wireless device has determined that it is to be responsible for beamforming of transmissions over the direct D2D communication link, or a non-acknowledgement (NACK) of the request if the second wireless device has determined that it is not to be responsible for beamforming of transmissions over the direct D2D communication link.

18. The method according to claim 11, wherein the received radio signal comprises an indication that no subsequent narrow beam refinement is required in the beamforming of transmissions between the second wireless device and the first wireless device over the direct D2D communication.

19. A second wireless device for handling beamformed transmissions between the second wireless device and a first wireless device over a direct device-to-device, D2D, communication link, the second wireless device comprising a processor and a memory, wherein the memory is containing instructions executable by the processor, causing the second wireless device to
- receive a radio signal from the first wireless device indicating that the first wireless device is, or that the second wireless device has an option to be, responsible for beamforming of transmissions over the direct D2D communication link,
- determine which of the first wireless device or the second wireless device is to be responsible for beamforming of transmissions over the direct D2D communication link, and
- transmit information to the first wireless device indicating which of the first wireless device or the second wireless device is to be responsible for beamforming of transmissions over the direct D2D communication link.

20. The second wireless device according to claim 19, further configured to perform beamformed transmissions towards the first wireless device over the direct D2D communication link.

* * * * *